(12) United States Patent
Driussi

(10) Patent No.: US 11,078,617 B2
(45) Date of Patent: Aug. 3, 2021

(54) LAUNDRY WASHING MACHINE COMPRISING A WATER SOFTENING DEVICE AND A LOCAL ELECTRONIC CONTROL UNIT

(71) Applicant: Electrolux Appliances Aktiebolag, Stockholm (SE)

(72) Inventor: Paolo Driussi, Porcia (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 197 days.

(21) Appl. No.: 16/084,412

(22) PCT Filed: Mar. 24, 2016

(86) PCT No.: PCT/EP2016/056551
§ 371 (c)(1),
(2) Date: Sep. 12, 2018

(87) PCT Pub. No.: WO2017/162291
PCT Pub. Date: Sep. 28, 2017

(65) Prior Publication Data
US 2019/0078252 A1 Mar. 14, 2019

(51) Int. Cl.
*D06F 39/00* (2020.01)
*D06F 39/02* (2006.01)
(Continued)

(52) U.S. Cl.
CPC ............ *D06F 39/007* (2013.01); *D06F 33/00* (2013.01); *D06F 39/028* (2013.01);
(Continued)

(58) Field of Classification Search
CPC ...... D06F 39/02; D06F 39/022; D06F 39/028; D06F 39/007
See application file for complete search history.

(56) References Cited

U.S. PATENT DOCUMENTS

| 2,434,353 A | 1/1948 | Edwards |
| 6,557,382 B1 * | 5/2003 | Koike .................. D06F 39/007 68/13 A |

(Continued)

FOREIGN PATENT DOCUMENTS

| CN | 1552635 A | 12/2004 |
| CN | 101029446 A | 9/2007 |

(Continued)

OTHER PUBLICATIONS

International Search Report and Written Opinion for International Application No. PCT/EP2016/056551, dated Jun. 1, 2016—12 pages.

(Continued)

*Primary Examiner* — Joseph L. Perrin
(74) *Attorney, Agent, or Firm* — RatnerPrestia

(57) ABSTRACT

A laundry washing machine having a washing tub, a rotatable drum, a detergent dispenser, a fresh-water supply circuit, a water softening device, a brine reservoir, and a pump assembly to move the brine from the brine reservoir to the water softening device for regenerating the same. The machine also has a water distributor module having: a manifold body having a water inlet and a number of water outlets; an electrically-operated, internal water channelling means are at least partially located inside the manifold body and are structured to selectively put the water inlet of the manifold body in fluid communication with any one of the water outlets of the same manifold body; and a local electronic control unit which is accommodated in a corresponding seat formed on the manifold body and moreover powers and/or controls both the pump assembly and the electrically-operated, internal water channeling means.

25 Claims, 10 Drawing Sheets

(51) Int. Cl.
  *D06F 39/08* (2006.01)
  *D06F 33/00* (2020.01)
(52) U.S. Cl.
  CPC ........ *D06F 39/088* (2013.01); *D06F 2202/02* (2013.01); *D06F 2204/02* (2013.01); *D06F 2204/086* (2013.01)

(56) References Cited

U.S. PATENT DOCUMENTS

| | | | |
|---|---|---|---|
| 6,823,878 | B1 | 11/2004 | Gadini |
| 10,012,971 | B2 | 7/2018 | Pietsch et al. |
| 2002/0116960 | A1 | 8/2002 | Nakada |
| 2005/0182568 | A1 | 8/2005 | Duraffourd et al. |
| 2006/0081016 | A1 | 4/2006 | Hsu et al. |
| 2006/0107705 | A1 | 5/2006 | Hsu et al. |
| 2007/0142931 | A1 | 6/2007 | Peral |
| 2009/0194562 | A1 | 8/2009 | Kessler et al. |
| 2010/0000027 | A1 | 1/2010 | Bae et al. |
| 2011/0056250 | A1* | 3/2011 | Kim ............... D06F 39/028 68/17 R |
| 2012/0058025 | A1 | 3/2012 | Fienup et al. |
| 2013/0047678 | A1* | 2/2013 | Lee ............... D06F 39/028 68/13 R |
| 2014/0157835 | A1* | 6/2014 | Del Pos .......... D06F 39/00 68/17 R |
| 2014/0157836 | A1* | 6/2014 | Zattin ........... D06F 39/028 68/17 R |
| 2014/0165665 | A1* | 6/2014 | Del Pos .......... D06F 39/02 68/200 |
| 2014/0165666 | A1* | 6/2014 | Del Pos .......... D06F 39/028 68/200 |
| 2014/0250607 | A1 | 9/2014 | Favaro et al. |
| 2015/0107309 | A1* | 4/2015 | Favaro ........... D06F 39/088 68/17 R |
| 2015/0107310 | A1* | 4/2015 | Del Pos .......... D06F 39/028 68/17 R |
| 2015/0204005 | A1* | 7/2015 | Favaro ........... D06F 39/028 68/17 R |
| 2016/0010266 | A1* | 1/2016 | Del Pos .......... D06F 33/00 68/13 A |
| 2017/0163437 | A1 | 6/2017 | Yang et al. |

FOREIGN PATENT DOCUMENTS

| | | |
|---|---|---|
| CN | 200975969 Y | 11/2007 |
| CN | 201648060 U | 11/2010 |
| CN | 202329748 U | 7/2012 |
| CN | 105278498 A | 1/2016 |
| CN | 105518548 A | 4/2016 |
| DE | 1642445 A1 | 4/1971 |
| DE | 3131543 A1 | 2/1983 |
| DE | 3703254 A1 | 8/1988 |
| DE | 3710511 A1 | 10/1988 |
| DE | 3736311 A1 | 5/1989 |
| DE | 4004057 A1 | 8/1991 |
| DE | 4313539 A1 | 10/1994 |
| DE | 4343539 C2 | 7/1996 |
| DE | 10204002 A1 | 8/2003 |
| EP | 1085118 A2 | 3/2001 |
| EP | 1087052 A2 | 3/2001 |
| EP | 1211491 A1 | 6/2002 |
| EP | 2251481 A | 11/2010 |
| EP | 2295625 A1 | 3/2011 |
| EP | 2554736 A1 | 2/2013 |
| EP | 2562303 A2 | 2/2013 |
| EP | 2578736 A1 | 4/2013 |
| EP | 2656771 A1 | 10/2013 |
| EP | 2657387 A1 | 10/2013 |
| EP | 3095907 A1 | 11/2016 |
| FR | 2438016 A1 | 4/1980 |
| FR | 2829579 A1 | 3/2003 |
| JP | 07270214 A1 | 10/1995 |
| JP | 11244580 A | 9/1999 |
| WO | 2014121820 A1 | 8/2014 |

OTHER PUBLICATIONS

Chinese Office Action for Chinese Application No. 201680083496.0, dated Jul. 29, 2020, 10 pages.
International Search Report and Written Opinion issued in International Application No. PCT/EP2017/084194, dated Mar. 23, 2018, 11 pages.
USPTO Non Final Office Action issued in U.S. Appl. No. 16/447,352, dated Jul. 20, 2020, 27 pages.
USPTO Final Office Action issued in U.S. Appl. No. 16/477,352, dated Dec. 7, 2020, 34 pages.
Chinese Office Action issued in Chinese Patent Application No. 201780078492.8, dated Dec. 24, 2020, 12 pages.
Chinese Office Action issued in Chinese Patent Application No. 201680083446.2, dated Jun. 30, 2020 with translation, 20 pages.
International Search Report and Written Opinion issued in International Application No. PCT/EP2016/056550, dated May 31, 2016, 11 pages.

\* cited by examiner

LAUNDRY WASHING MACHINE COMPRISING A WATER SOFTENING DEVICE AND A LOCAL ELECTRONIC CONTROL UNIT

The present invention relates to a laundry washing machine.

More in particular, the present invention relates to a front-loading home laundry washing machine, to which the following description refers purely by way of example without this implying any loss of generality.

As is known, a front-loading home laundry washing machine generally comprises: a substantially parallelepiped-shaped outer boxlike casing structured for resting on the floor; a substantially horizontally-oriented and approximately cylindrical washing tub which is usually suspended in floating manner inside the casing, with the front mouth directly facing a laundry loading/unloading through opening realized in the front wall of the casing; a substantially cylindrical, cup-shaped rotatable drum structured for housing the laundry to be washed, and which is fitted inside the washing tub with the concavity facing the laundry loading/unloading opening, and is supported by the washing tub in axially rotatable manner so as to be able to freely rotate inside the washing tub about its substantially horizontally-oriented, longitudinal axis; a substantially cylindrical, elastically-deformable bellows which watertight connects the front mouth of the washing tub to the laundry loading/unloading opening formed in the front wall of the casing; a porthole door which is hinged to the front wall of the casing to rotate to and from a closing position in which the door closes the laundry loading/unloading opening in the front wall of the casing for watertight sealing the washing tub; and an electrically-powered motor assembly which is structured for driving into rotation the rotatable drum about its longitudinal axis inside the washing tub.

This type of laundry washing machine furthermore comprises: a detergent dispenser which is located inside the boxlike casing, immediately above the washing tub, and is structured for selectively feeding into the washing tub, according to the washing cycle manually-selected by the user, a given amount of detergent, softener and/or other washing agent suitably mixed with fresh water arriving from the water mains; a fresh-water supply circuit which is structured for selectively drawing fresh water from the water mains according to the washing cycle manually-selected by the user, and channelling said fresh water to the detergent dispenser or directly to the washing tub; and finally an appliance control panel which is generally located on the front wall of the casing, above the laundry loading/unloading opening, and is structured for allowing the user to manually select the desired washing-cycle.

In addition to the above, high-end front-loading laundry washing machines may optionally have an internal water softening device which is located along the fresh-water supply circuit, and is structured to selectively reduce the hardness degree of the tap water channelled towards the detergent dispenser and the washing tub. The use of softened water during the washing cycle, in fact, significantly improves cleaning performances.

More in detail, the water softening device is generally internally provided with a given amount of ion-exchange resins which are capable of retaining the calcium and magnesium ions ($Ca^{++}$ and $Mg^{++}$) dissolved in the water flowing through the same water softening device, so as to reduce the hardness degree of the tap water directed towards the detergent dispenser and the washing tub.

In addition to the above, since the water softening capabilities of the ion-exchange resins are used to quickly drop away after a limited number of washing cycles, the laundry washing machines referred above are generally provided with an internal reservoir of salt (NaCl) to be used for selectively producing some brine (i.e. salt water) which is periodically channeled into the water softening device to regenerate the ion-exchange resins located therein. Salt water, in fact, is able to remove from the ion-exchange resins the calcium and magnesium ions previously combined/fixed to said resins.

More in detail, in these laundry washing machines the salt to be used in the regeneration process of the ion-exchange resins is generally stowed into a large basin-shaped, regeneration-agent compartment formed in the detergent drawer of detergent dispenser, beside the traditional basin-shaped, detergent compartments. The drawer flush circuit of the detergent dispenser is capable of selectively and alternatively channelling the fresh water arriving from the fresh-water supply circuit either into the regeneration-agent compartment to form some brine (i.e. salt water) that accumulates into a basin-shaped bottom portion of the drawer housing, or into any one of the detergent compartments to flush the detergent therein directly into the washing tub.

A small electric pump is finally used for transferring the brine from the basin-shaped, bottom portion of drawer housing to the water softening device.

Unfortunately integration of the water softening device into the laundry washing machine makes the electric circuit of the household appliance much more complicated, with the drawbacks that this entails.

Aim of the present invention is to simplify the structure of the electric circuit of the laundry washing machines having an internal water softening device.

In compliance with the above aims, according to the present invention there is provided a laundry washing machine having an outer casing and comprising, inside said outer casing: a washing tub; a rotatable drum which is housed in axially rotatable manner inside the washing tub and is structured for housing the laundry to be washed; a detergent dispenser which is structured for supplying detergent into the washing tub; a fresh-water supply circuit which is structured for selectively channelling a flow of fresh water from the water mains towards the detergent dispenser and/or the washing tub; an internal water softening device which is connected to said detergent dispenser and/or said fresh-water supply circuit for being crossed by the fresh water directed towards the detergent dispenser and/or the washing tub, and is filled with a water softening agent capable of reducing the hardness degree of said fresh water;

the laundry washing machine being characterized by additionally comprising a brine reservoir for receiving and accumulating a given amount of brine; a pump assembly capable of selectively moving the brine from said brine reservoir to said water softening device for regenerating the water softening properties of said water softening agent; and a water distributor module for supplying water to said detergent dispenser;

said water distributor module in turn comprising: a manifold body having a water inlet and a number of water outlets; electrically-operated, internal water channelling means which are at least partially located inside the manifold body, and are structured to selectively put the water inlet of the manifold body in fluid communication with any one of the water outlets of the same manifold body; and a local electronic control unit which is accommodated in a corresponding seat formed on said manifold body and moreover powers and/or controls both said pump assembly and said electrically-operated, internal water channeling means.

Preferably, though not necessarily, the laundry washing machine is furthermore characterized in that the water inlet of said water distributor module fluidically communicates with said fresh-water supply circuit and/or said water softening device for receiving unsoftened and/or softened fresh water.

Preferably, though not necessarily, the laundry washing machine is furthermore characterized in that one or more of the water outlets of the water distributor module fluidically communicate with said detergent dispenser.

Preferably, though not necessarily, the laundry washing machine is furthermore characterized by additionally comprising a regeneration-agent reservoir structured for being manually fillable with a given amount of consumable salt or other regeneration agent, and a first water-supply line which is structured for selectively channelling a flow of water into said regeneration-agent reservoir so as to form brine; said brine reservoir being fluidically connected to said regeneration-agent reservoir for receiving and accumulating the brine arriving from said regeneration-agent reservoir.

Preferably, though not necessarily, the laundry washing machine is furthermore characterized in that a water outlet of the water distributor module fluidically communicates with said first water-supply line.

Preferably, though not necessarily, the laundry washing machine is furthermore characterized in that a water outlet of the water distributor module fluidically communicates with said brine reservoir.

Preferably, though not necessarily, the laundry washing machine is furthermore characterized by additionally comprising a detector assembly which is associated to the brine reservoir, and is capable of monitoring the salinity degree of the brine stored into the brine reservoir and/or the level of the water or brine stored inside brine reservoir; the local electronic control unit electronically communicating with said detector assembly.

Preferably, though not necessarily, the laundry washing machine is furthermore characterized in that said detector assembly is capable of detecting whether the salinity degree of the brine stored into the brine reservoir exceeds a predetermined minimum salinity value sufficient to successfully perform the regeneration process of the water softening agent contained into the water softening device.

Preferably, though not necessarily, the laundry washing machine is furthermore characterized in that said detector assembly is capable of detecting whether the amount of brine contained into the brine reservoir is sufficient to successfully perform the regeneration process of the water softening agent contained into the water softening device.

Preferably, though not necessarily, the laundry washing machine is furthermore characterized in that said electrically-operated, internal water channelling means comprise: a flow diverter which is fitted movable manner inside the manifold body of said water distributor module, and is capable of channeling, according to its position inside the manifold body, the water entering into the manifold body via the water inlet towards any one of the water outlets of the same manifold body; and an electrically-powered motor assembly which is fixed to the manifold body of said water distributor module, and is mechanically connected to the flow diverter for controlling the position of the flow diverter inside said manifold body.

Preferably, though not necessarily, the laundry washing machine is furthermore characterized in that said flow diverter is fitted in rotatable manner inside the manifold body of said water distributor module, and is capable of channeling, according to its angular position inside the manifold body, the water entering into the manifold body via the water inlet towards any one of the water outlets of the same manifold body; the electrically-powered motor assembly, being able to control the angular position of the flow diverter inside said manifold body.

Preferably, though not necessarily, the laundry washing machine is furthermore characterized in that the manifold body of the water distributor module comprises a first inner compartment or seat accommodating the flow diverter, a second compartment or seat accommodating the electrically-powered motor assembly, and a third inner compartment or seat accommodating said local electronic control unit.

Preferably, though not necessarily, the laundry washing machine is furthermore characterized in that said detergent dispenser comprises: a first drawer which is provided with one or more substantially basin-shaped, detergent compartments structured for being manually finable with a given amount of detergent, softener or other washing agent, and which is fitted/inserted in extractable manner into a corresponding drawer housing recessed into the outer casing; and a drawer flush circuit which is fluidically connected to the fresh-water supply circuit and/or the water softening device via said water distributor module, and is structured for pouring the water arriving from said fresh-water supply circuit or said water softening device into any one of said detergent compartments.

Preferably, though not necessarily, the laundry washing machine is furthermore characterized in that said drawer flush circuit comprises a water conveyor which forms the upper lid of the drawer housing of the first drawer, so as to be located above the first drawer when said first drawer is inserted/recessed into the drawer housing, and is provided with a number of first water-delivery portions each of which is vertically aligned to a respective detergent compartment and is structured to allow the outflow of the water from the water conveyor towards the beneath-located detergent compartment; and in that said water distributor module is associated to said water conveyor so that a number of the water outlets of said water distributor module fluidically communicate with corresponding first water-delivery portions of said water conveyor.

Preferably, though not necessarily, the laundry washing machine is furthermore characterized in that said regeneration-agent reservoir is a substantially basin-shaped, regeneration-agent compartment which is located on said first drawer beside the one or more detergent compartments.

Preferably, though not necessarily, the laundry washing machine is furthermore characterized by additionally comprising a second drawer which is fitted/inserted in extractable manner into a corresponding drawer housing recessed into the outer casing, beside the first drawer, and which is provided with a substantially basin-shaped, regeneration-agent compartment forming said regeneration-agent reservoir.

Preferably, though not necessarily, the laundry washing machine is furthermore characterized in that the water conveyor is additionally provided with a second water-delivery portion which is locally aligned to the regeneration-agent compartment of said first or second drawer; and in that a water outlet of said water distributor module fluidically communicates with said second water-delivery portion.

Preferably, though not necessarily, the laundry washing machine is furthermore characterized in that said brine reservoir is a discrete brine tank which is located underneath the drawer housing of said first or of said second drawer and which fluidically communicates with said drawer housing for receiving the brine coming out from the regeneration-agent compartment of said first or said second drawer.

Preferably, though not necessarily, the laundry washing machine is furthermore characterized in that the detergent dispenser, the water softening device, the regeneration-agent reservoir, the brine reservoir, the pump assembly and the local electronic control unit altogether form an intermediate modular assembly structured to be fitted into the outer casing.

Preferably, though not necessarily, the laundry washing machine is furthermore characterized by additionally comprising an auxiliary water-supply line which is structured for selectively channelling a flow of fresh water into said brine reservoir bypassing said regeneration-agent reservoir; the local electronic control unit directly controlling also said auxiliary water-supply line.

Preferably, though not necessarily, the laundry washing machine is furthermore characterized in that the water conveyor of the drawer flush circuit is additionally provided with a third water-delivery portion which is structured to allow the outflow of the water from the water conveyor towards the brine reservoir bypassing the regeneration-agent compartment; and in that a water outlet of said water distributor module fluidically communicates with said water-delivery portion.

Preferably, though not necessarily, the laundry washing machine is furthermore characterized by additionally comprising a main electronic control unit which is adapted to implement a washing cycle selected by the user and which electronically communicates with the local electronic control unit so that the pump assembly and the internal water channeling means are driven according to the signals arriving from said main electronic control unit; said main electronic control unit being located on a supporting structure which is different and discrete from the manifold body of the water distributor module.

Preferably, though not necessarily, the laundry washing machine is furthermore characterized in that water softening device contains a given amount of ion-exchange resins capable of retaining the calcium and magnesium ions dissolved in the water that flows through the same water softening device.

Preferably, though not necessarily, the laundry washing machine is furthermore characterized in that said regeneration-agent reservoir is dimensioned to accommodate an amount of consumable salt or other regeneration agent sufficient for performing one or more regeneration processes of water softening capabilities of the water softening agent contained into the water softening device.

A non-limiting embodiment of the present invention will now be described, by way of example, with reference to the accompanying drawings, in which.

Figure 1:
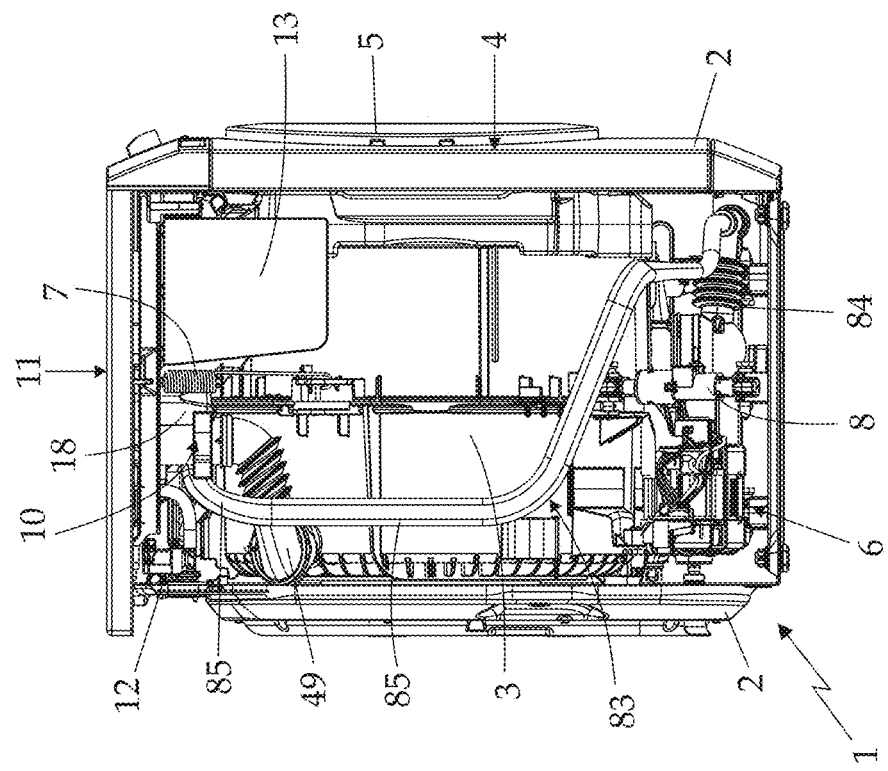
FIG. 1 is a perspective view of a laundry washing machine realized in accordance with the teachings of the present invention, with parts removed for clarity.
Figure 2:
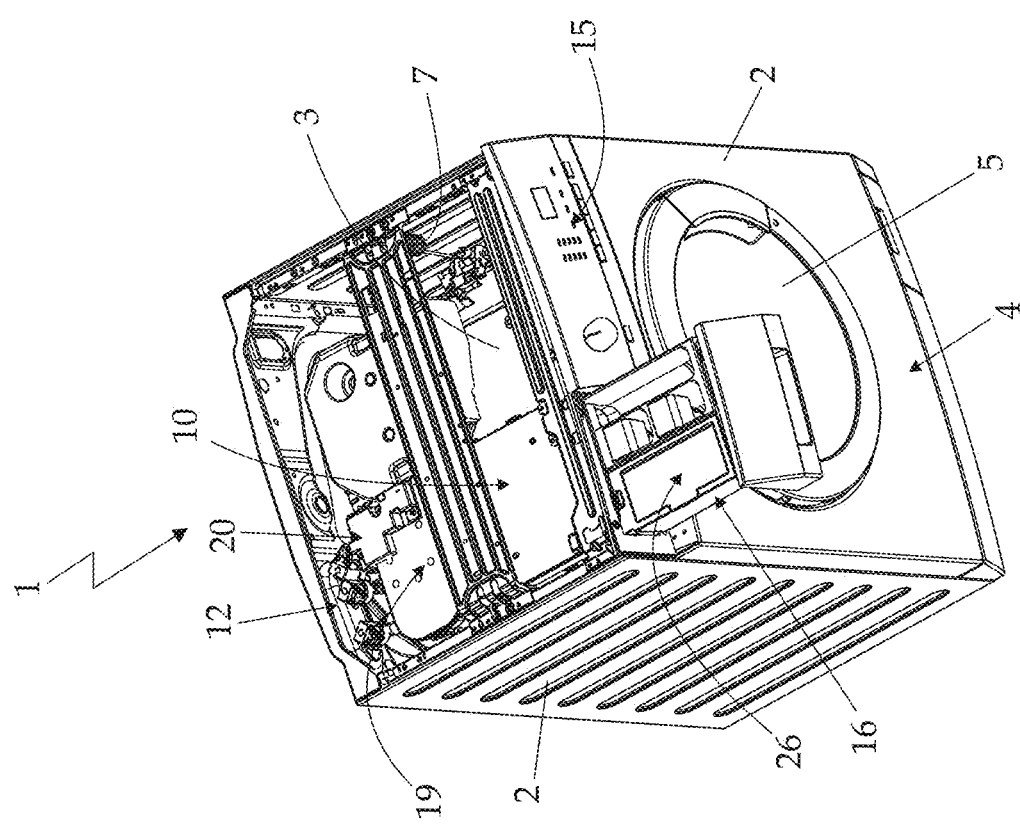
FIG. 2 is a side view of the FIG. 1 laundry washing machine, with parts removed to for clarity.
Figure 3:
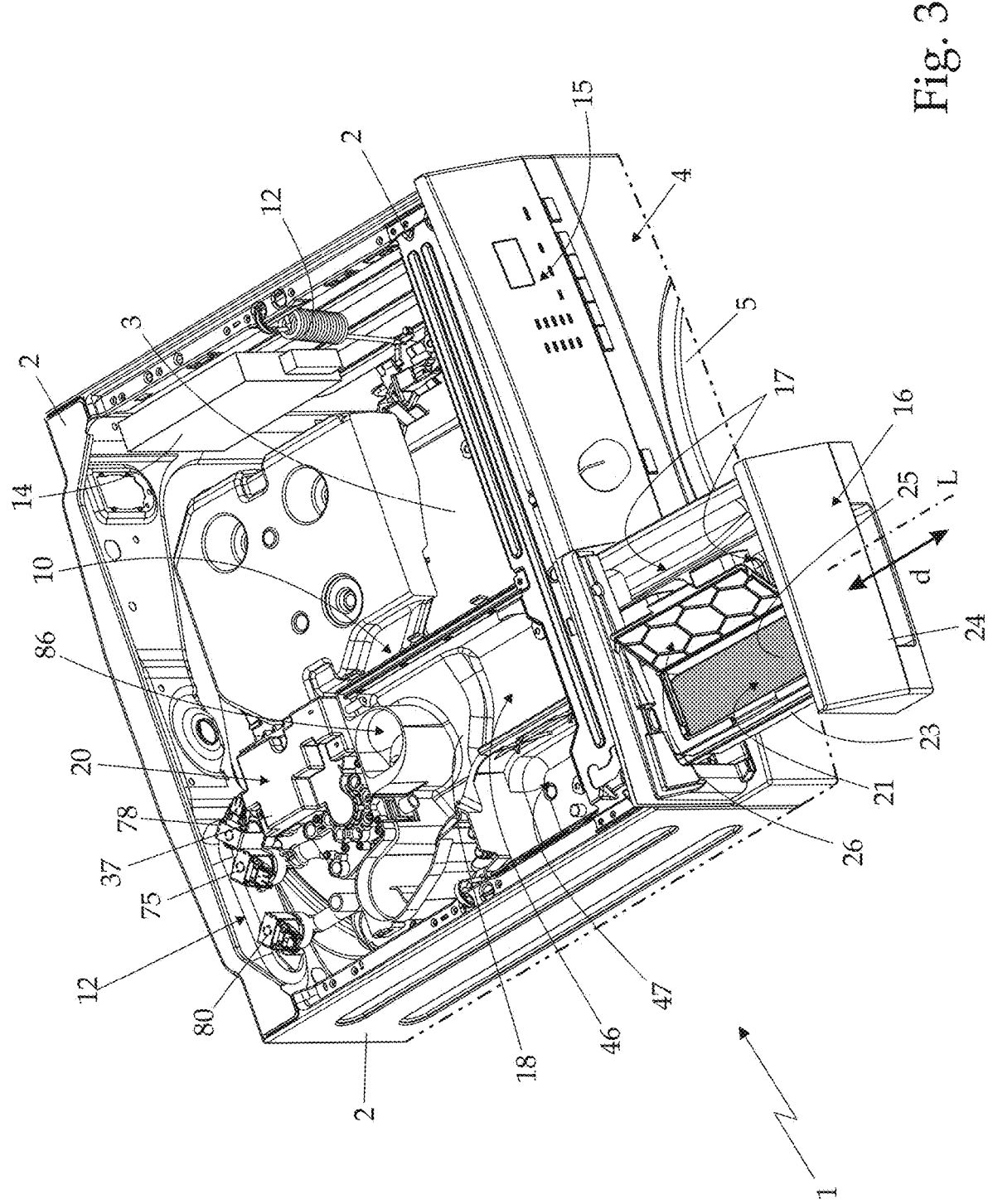
FIG. 3 is an enlarged perspective view of the top portion of the FIG. 1 laundry washing machine, with parts removed for clarity.
Figure 13:
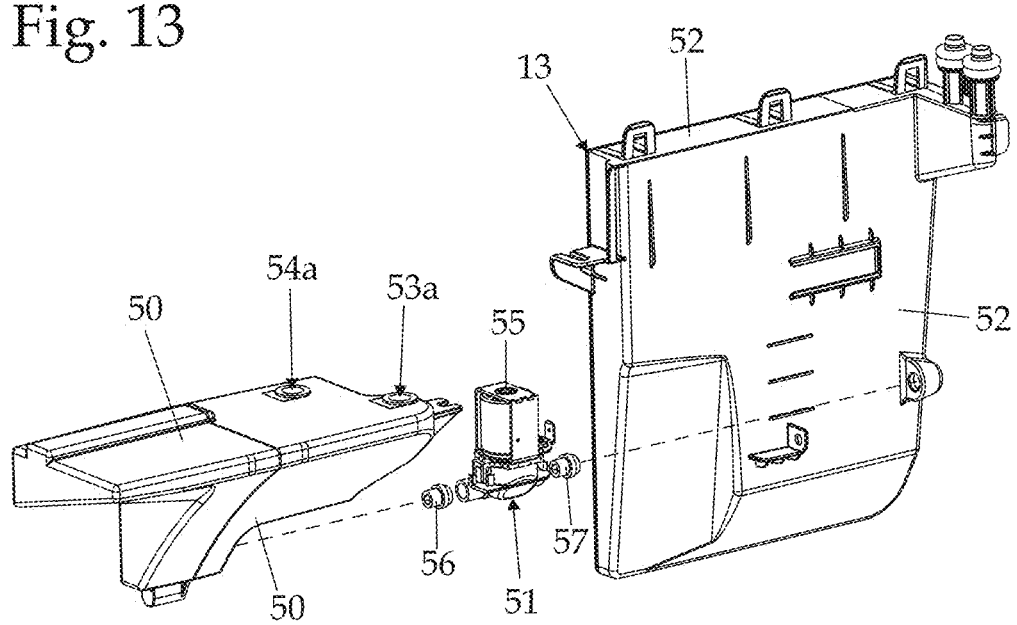
FIG. 13 is an enlarged and partially exploded perspective view of part of the detergent dispensing assembly shown in FIGS. 4, 6 and 7, with parts removed for clarity.
Figure 14:
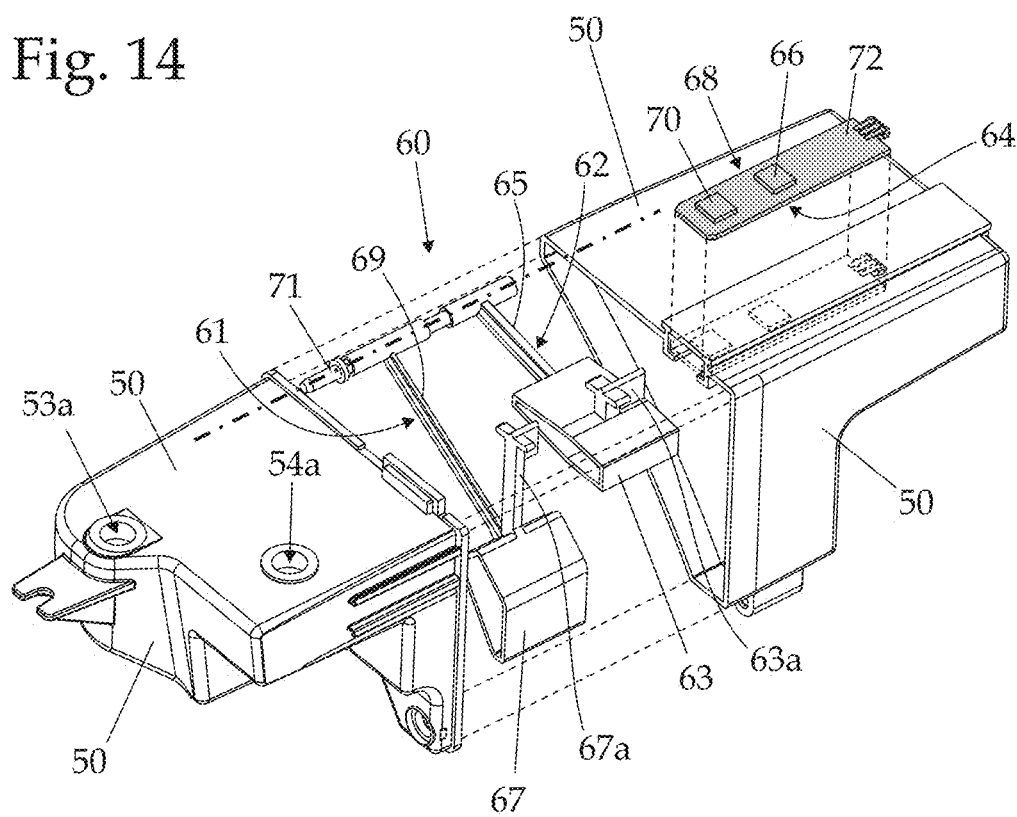
Figure 15:
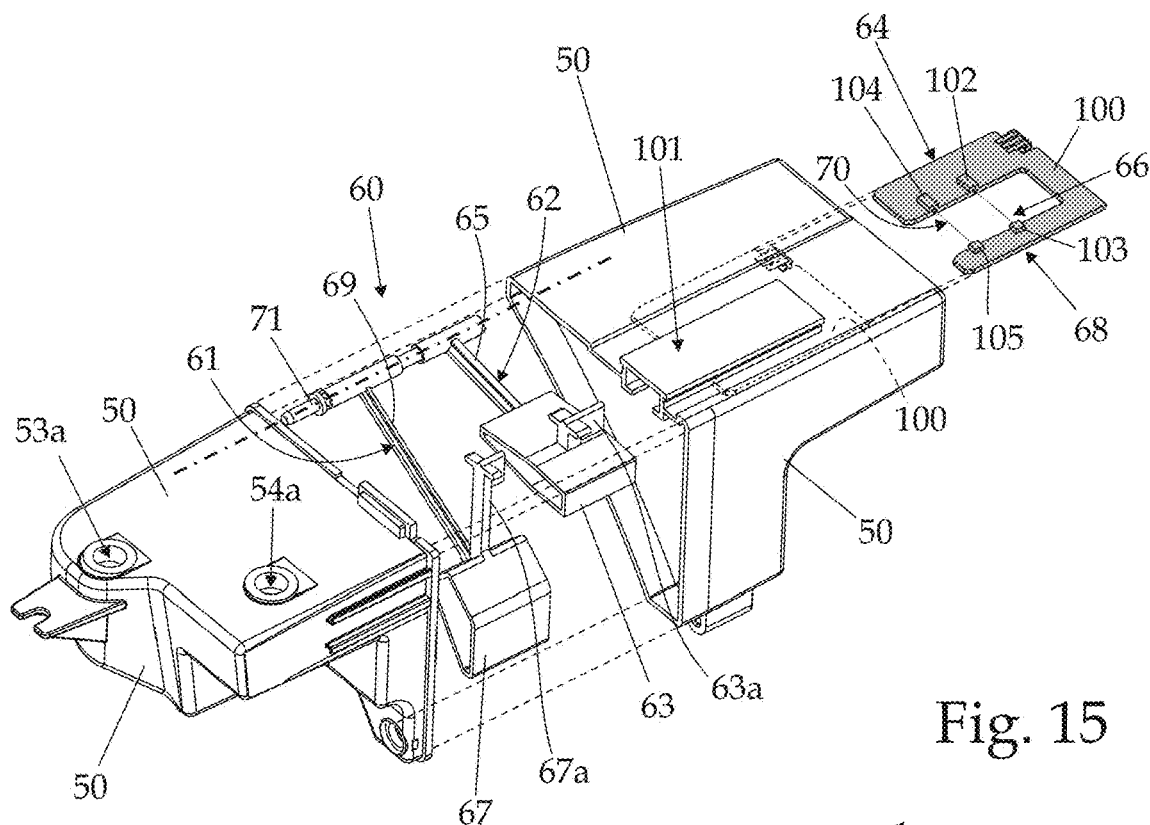
Figure 16:
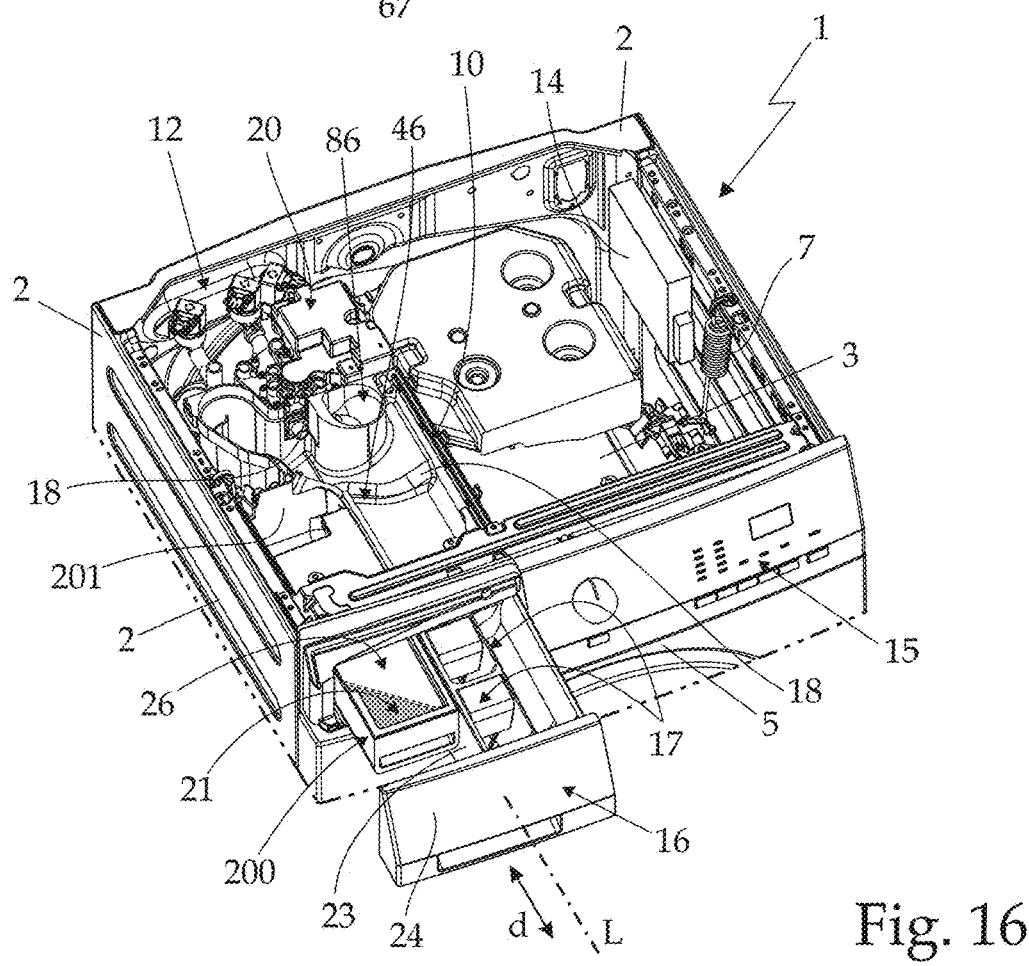

FIG. 14 is an enlarged and partially exploded perspective view of the brine tank of the detergent dispensing assembly shown in FIG. 13, with parts removed for clarity; whereas FIGS. 15 and 16 are perspective views of the top portion of two further embodiments of the FIG. 1 laundry washing machine shown, with parts removed for clarity, With reference to FIGS. 1, 2 and 3, reference number 1 indicates as a whole a laundry washing machine 1 which preferably basically comprises: a preferably substantially parallelepiped-shaped, outer boxlike casing 2 structured for resting on the floor; a preferably substantially horizontally-oriented, approximately cylindrical washing tub 3 which is arranged inside the casing 2 with the mouth directly facing a laundry loading/unloading pass-through opening realized in the front wall 4 of the outer casing 2; a substantially cylindrical, cup-shaped rotatable drum (not shown) which is structured for housing the laundry to be washed, and is fitted in axially rotatable manner inside the washing tub 3 with the concavity facing the front opening or mouth of washing tub 3, so as to be able to freely rotate about its longitudinal axis inside the washing tub 3; a porthole door 5 which is hinged to the front wall 4 of casing 2 so as to be movable to and from a closing position in which the door 5 closes the laundry loading/unloading opening on front wall 4 for watertight sealing the washing tub 4; and an electrically-powered motor assembly 6 which is structured for driving into rotation the rotatable drum (not shown) about its longitudinal axis inside the washing tub 3.

In the example shown, in particular, the rotatable drum (not shown) of laundry washing machine 1 is preferably arranged inside the washing tub 3 with the drum rotation axis locally substantially coaxial to the longitudinal axis of washing tub 3, i.e. oriented substantially horizontally, and with the circular front opening or mouth of the drum directly aligned and faced to the circular front opening or mouth of washing tub 3, so as to receive the laundry to be washed through the laundry loading/unloading opening realized on front wall 4.

The washing tub 3, in turn, is preferably suspended in floating manner inside the casing 2 via a suspension system that preferably, though not necessarily, comprises at least one, and preferably a couple of upper coil springs 7 connecting the upper portion of washing tub 3 to the top of casing 2, and preferably at least one, and preferably a couple of vibration dampers 8 connecting the bottom portion of washing tub 3 to the bottom of casing 2. Moreover the laundry washing machine 1 is preferably provided with a substantially cylindrical elastically-deformable bellows (not shown) which watertight connects the front mouth of washing tub 3 to the laundry loading/unloading opening realized on front wall 4 of casing 2.

With reference to FIGS. 1, 2, 3, 4 and 5, the laundry washing machine 1 furthermore comprises: a detergent dispenser 10 which is located inside the casing 2 preferably above the washing tub 3 and preferably, though not necessarily, immediately underneath the upper worktop or top wall 11 of casing 2, and is structured for selectively feeding into the washing tub 3, according to the washing cycle manually-selected by the user, a given amount of detergent, softener and/or other washing agent suitably mixed with fresh water; a main fresh-water supply circuit 12 which is connectable directly to the water mains, and is structured for selectively channelling, according to the washing cycle manually-selected by the user, a flow of fresh water from the water mains to the detergent dispenser 10 or directly to the washing tub 3; and an internal water softening device 13 which is located inside the boxlike casing 2, along the fresh-water supply circuit 12 or along the detergent dispenser 10, and is structured for selectively reducing, during each washing cycle, the hardness degree of the tap water that fresh-water supply circuit 12 channels towards detergent dispenser 10 or washing tub 3.

More in detail, the water softening device 13 basically consists in a closed container which has a water inlet and a water outlet fluidically connected to the fresh-water supply circuit 12 and/or the detergent dispenser 10 so as to be crossed by the tap water directed towards the washing tub 3, and which is furthermore filled with a given amount of ion-exchange resins capable of retaining the calcium and magnesium ions ($Ca^{++}$ and $Mg^{++}$) dissolved in the water flowing through the same container, so as to reduce the hardness degree of the tap water directed towards the washing tub 3.

In the example shown, in particular, the water softening device 13 is preferably located inside the boxlike casing 2 adjoined to the detergent dispenser 10, and is preferably fluidically connected directly to detergent dispenser 10 so as to be crossed by the fresh water flowing along the detergent dispenser 10 towards the washing tub 3.

With reference to FIGS. 1 and 3, in addition to the above, the laundry washing machine 1 furthermore comprises: a main electronic control unit 14 which controls the motor assembly 6, the detergent dispenser 10 and the fresh-water supply circuit 12 so as to perform the washing cycle currently selected by the user; and preferably also an appliance control panel 15 which electronically communicates with control unit 14 and is structured to allow the user to manually select the desired washing cycle among a number of available washing cycles.

The main electronic control unit 14 is located inside the casing 2, preferably, though not necessarily, adjacent to a side wall of the casing 2 and preferably, though not necessarily, immediately underneath the upper worktop or top wall 11. The appliance control panel 15, in turn, is preferably located on front wall 4 of casing 2, above the laundry loading/unloading opening and preferably also immediately beneath the upper worktop or top wall 11 of casing 2.

With reference to FIGS. 3-8, detergent dispenser 10 in turn basically comprises: a detergent drawer 16 which is provided with one or more substantially basin-shaped, detergent compartments 17 (three detergent compartments 17 in the example shown) each structured for being manually tillable with a given amount of detergent, softener or other washing agent, and which is fitted/inserted in manually extractable manner into a corresponding preferably substantially basin-shaped, drawer housing 18 which, in turn, is located/recessed inside the casing 2 above washing tub 3, and whose entrance is preferably located on front wall 4 of casing 2, above the laundry loading/unloading opening realized on the same front wall 4; and a drawer flush circuit 19 which is structured for receiving the fresh water of the water mains from the water softening device 13 and/or from the fresh-water supply circuit 12, and for selectively channelling/pouring, when the detergent drawer 16 is completely fitted/inserted into drawer housing 18, said fresh water into any one of the detergent compartments 17 of detergent drawer 16, so as to selectively flush the detergent, softener or other washing agent out of the same detergent compartment 17 and down onto the bottom of drawer housing 18.

In addition to the above, the laundry washing machine 1 moreover comprises an electrically-operated, water distributor module 20 which is interposed between the detergent dispenser 10, or better the drawer flush circuit 19 of detergent dispenser 10, and the water softening device 13 and/or the fresh-water supply circuit 12. The water distributor module 20 is controlled by the main electronic control unit 14, and is structured for selectively supplying the fresh water of the water mains to the drawer flush circuit 19 of the detergent dispenser 10.

More in detail, the water distributor module 20 is preferably interposed between the drawer flush circuit 19 of detergent dispenser 10 and both the internal water softening device 13 and the fresh-water supply circuit 12, thus to be able to selectively supply to the drawer flush circuit 19 of the detergent dispenser 10 a flow of softened or unsoftened fresh water.

Figure 4:
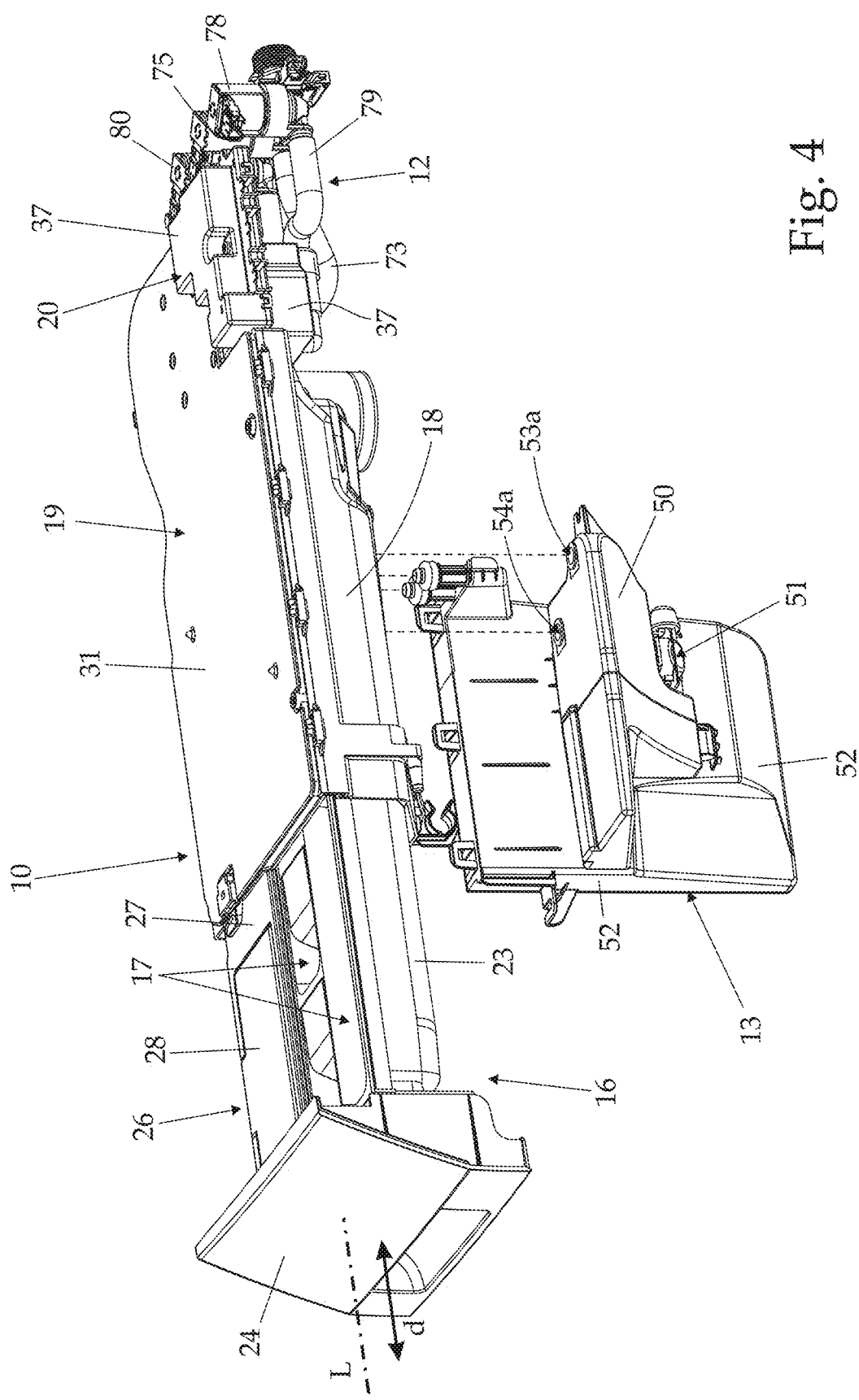
FIG. 4 is a partially exploded perspective view of the detergent dispensing assembly of the FIG. 1 laundry washing machine, with parts removed for clarity.
Figure 6:
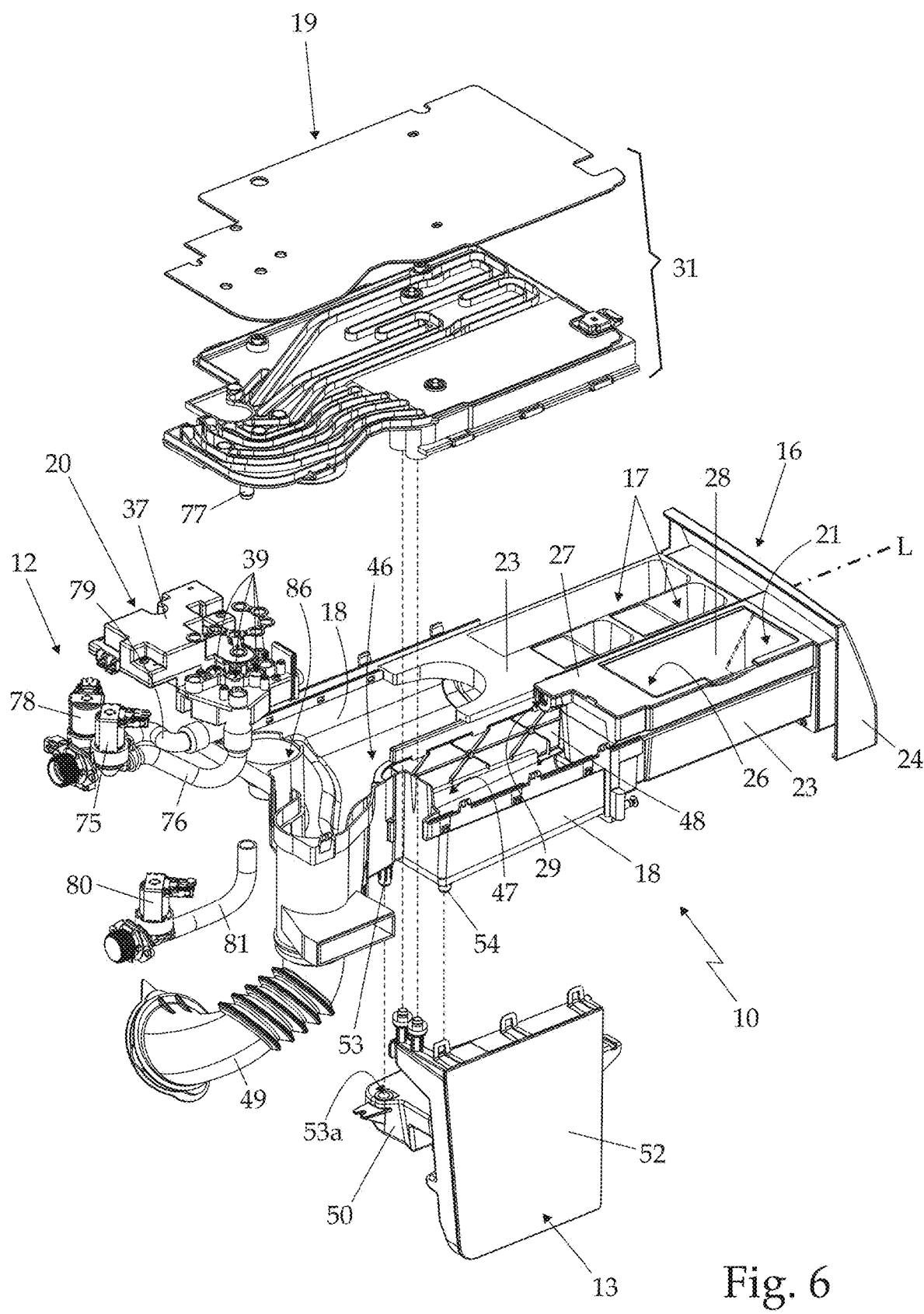
FIG. 6 is a partially exploded perspective view of the detergent dispensing assembly shown in FIG. 4, with parts in section and parts removed for clarity.

With reference to FIGS. 3, 4 and 6, in the example shown, in particular, the detergent drawer 16 is preferably movable inside the drawer housing 18 parallel to the substantially horizontally-oriented, longitudinal axis L of same drawer housing 18 between:

a retracted position (see FIG. 2) in which detergent drawer 16 is completely fitted/inserted into drawer housing 18, so as to be almost completely recessed into the front wall 4 of casing 2; and a completely extracted position (see FIGS. 1, 3, 4 and 6) in which detergent drawer 16 partly juts out from the front wall 4 of casing 2, so as to expose the one or more detergent compartments 17 at once.

In other words, detergent drawer 16 is movable inside the drawer housing 18 in a substantially horizontally-oriented, displacement direction d which is locally substantially parallel to the longitudinal axis L of both drawer housing 18 and detergent drawer 16, between:

a retracted position (see FIG. 2) in which detergent drawer 16 is almost completely recessed into the front wall 4 of casing 2 and the one or more detergent compartments 17 of detergent drawer 16 are inaccessible to the user; and a completely extracted position (see FIGS. 1, 3, 4 and 6) in which detergent drawer 16 partly juts out from the front wall 4 of casing 2, so that all detergent compartments 17 of detergent drawer 16 are fully accessible to the user at same time.

In the example shown, furthermore, the entrance of drawer housing 18 is preferably located on front wall 4 of casing 2, immediately underneath the upper worktop or top wall 11 of casing 2 and substantially horizontally aligned beside the appliance control panel 15. Moreover the longitudinal axis L of both detergent drawer 16 and drawer housing 18, and as a consequence the displacement direction d of detergent drawer 16, are preferably locally substantially perpendicular to front wall 4 of casing 2.

Preferably each detergent compartment 17 is additionally dimensioned to contain a given amount of detergent, softener or other washing agent sufficient for performing only a single washing cycle.

In addition to the above, the detergent drawer 16 preferably has, inside each detergent compartment 17, a siphon assembly suitably structured/dimensioned to selectively channel the mixture of water and detergent, softener or other washing agent formed inside the detergent compartment 17 out of the same detergent compartment 17 and down onto the bottom of drawer housing 18.

As an alternative to the siphon assembly, detergent drawer 16 may have, on the bottom of the detergent compartment 17, a large pass-through opening which is suitably shaped/dimensioned to allow the mixture of water and detergent, softener or other washing agent formed inside the same detergent compartment 17 to freely fall on the bottom of drawer housing 18.

Preferably the drawer flush circuit 19, in turn, is structured for directly pouring, when detergent drawer 16 is placed in the retracted position, a shower of water droplets by gravity selectively and alternatively into any one of the detergent compartments 17 of detergent drawer 16, so as to selectively flush the detergent, softener or other washing agent out of the same detergent compartment 17 and down onto the bottom of drawer housing 18.

In addition to the above, with reference to FIGS. 3 to 8, detergent drawer 16 is preferably furthermore provided with a substantially basin-shaped, regeneration-agent compartment 21 which is located beside the one or more detergent compartments 17, and is structured for being manually tillable with a given quantity of salt grains (NaCl) or other regeneration agent suitable to be used in the regeneration process of the ion-exchange resins of the water softening device 13.

More in details, the regeneration-agent compartment 21, i.e. the regeneration-agent reservoir, is preferably arranged, on detergent drawer 16, beside the one or more detergent compartments 17 transversally to the displacement direction d of detergent drawer 16, so that both detergent compartment/s 17 and regeneration-agent compartment 21 are allowed to almost contemporaneously come out from the front wall 4 of casing 2 when detergent drawer 16 moves from the retracted position to the extracted position.

Detergent drawer 16 is therefore movable inside drawer housing 18 in the substantially horizontally-oriented, displacement direction d between:
  a retracted position (see FIG. 2) in which detergent drawer 16 is completely recessed into the front wall 4 of casing 2, so that both the detergent compartment/s 17 and the regeneration-agent compartment 21 are inaccessible to the user; and
  a completely extracted position (see FIGS. 1, 3, 4 and 6) in which detergent drawer 16 partly juts out from the front wall 4 of casing 2, so that both the detergent compartment/s 17 and the regeneration-agent compartment 21 are simultaneously fully exposed and accessible to the user.

Preferably the regeneration-agent compartment 21 is moreover dimensioned to accommodate/contain an amount of consumable salt grains (NaCl) or other regeneration agent sufficient for performing a plurality of regeneration processes of the ion-exchange resins of the water softening device 11.

Figure 8:
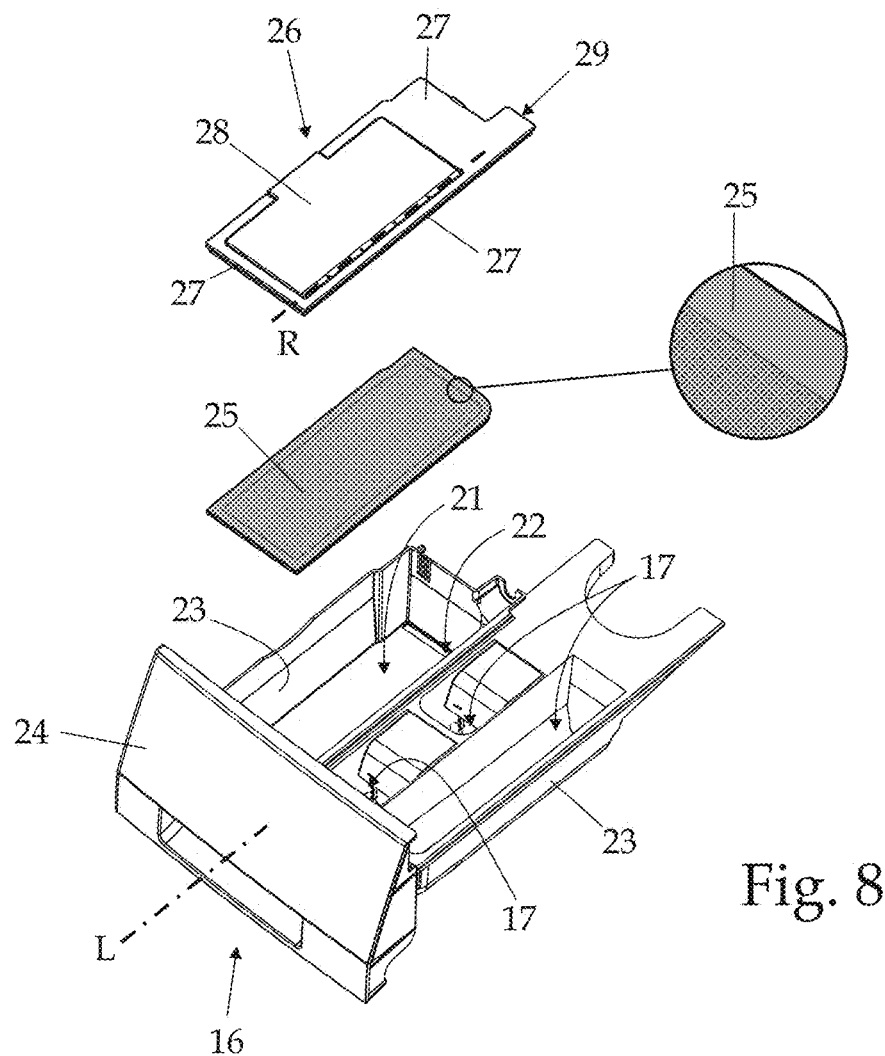
FIG. 8 is a partially exploded perspective view of the detergent drawer of the detergent dispensing assembly shown in FIGS. 6 and 7, with parts removed for clarity.

With reference to FIG. 8, in addition to the above the detergent drawer 16 preferably has, on the bottom of regeneration-agent compartment 21, a large pass-through draining opening 22 which is suitably shaped/dimensioned to allow the brine (i.e. the salt water) formed inside the regeneration-agent compartment 21 to freely fall on the bottom of drawer housing 18.

The drawer flush circuit 19, in turn, is preferably structured for separately channelling, when detergent drawer 16 is placed in the retracted position, the fresh water of the water mains also into the regeneration-agent compartment 21, so as to dissolve some of the salt grains contained into the regeneration-agent compartment 21 and form some brine (i.e. salt water).

In other words, drawer flush circuit 19 is preferably structured for selectively and separately pouring/channeling, when the detergent drawer 16 is completely fitted/inserted into drawer housing 18, the fresh water arriving from the water mains into any one of the detergent compartments 17 and also into the regeneration-agent compartment 21.

In case of detergent compartment/s 17, the poured fresh water serves to selectively flush the contents of the detergent compartment 17 out of the same compartment 17 and down on the bottom of drawer housing 18 via the corresponding siphon assembly. In case of regeneration-agent compartment 21, the poured fresh water serves to dissolve some salt grains contained into the regeneration-agent compartment 21 to form the brine the salt water) that falls on the bottom of drawer housing 18 via draining opening 22.

With reference to FIGS. 4, 6, 7 and 8, in the example shown, in particular, detergent drawer 16 preferably comprises: a drawer main body 23 which is preferably made in a one piece construction, and is fitted/inserted in axially sliding manner into the drawer housing 18; and a manually-sizable front panel 24 which is arranged/located on a front side of the drawer main body 23, so as to close the entrance of drawer housing 18 when detergent drawer 16 is placed in the retracted position (see FIG. 2). The one or more basin-shaped detergent compartments 17 and the basin-shaped regeneration-agent compartment 21 are formed directly on the drawer main body 23 one side by side the other.

Figure 7:
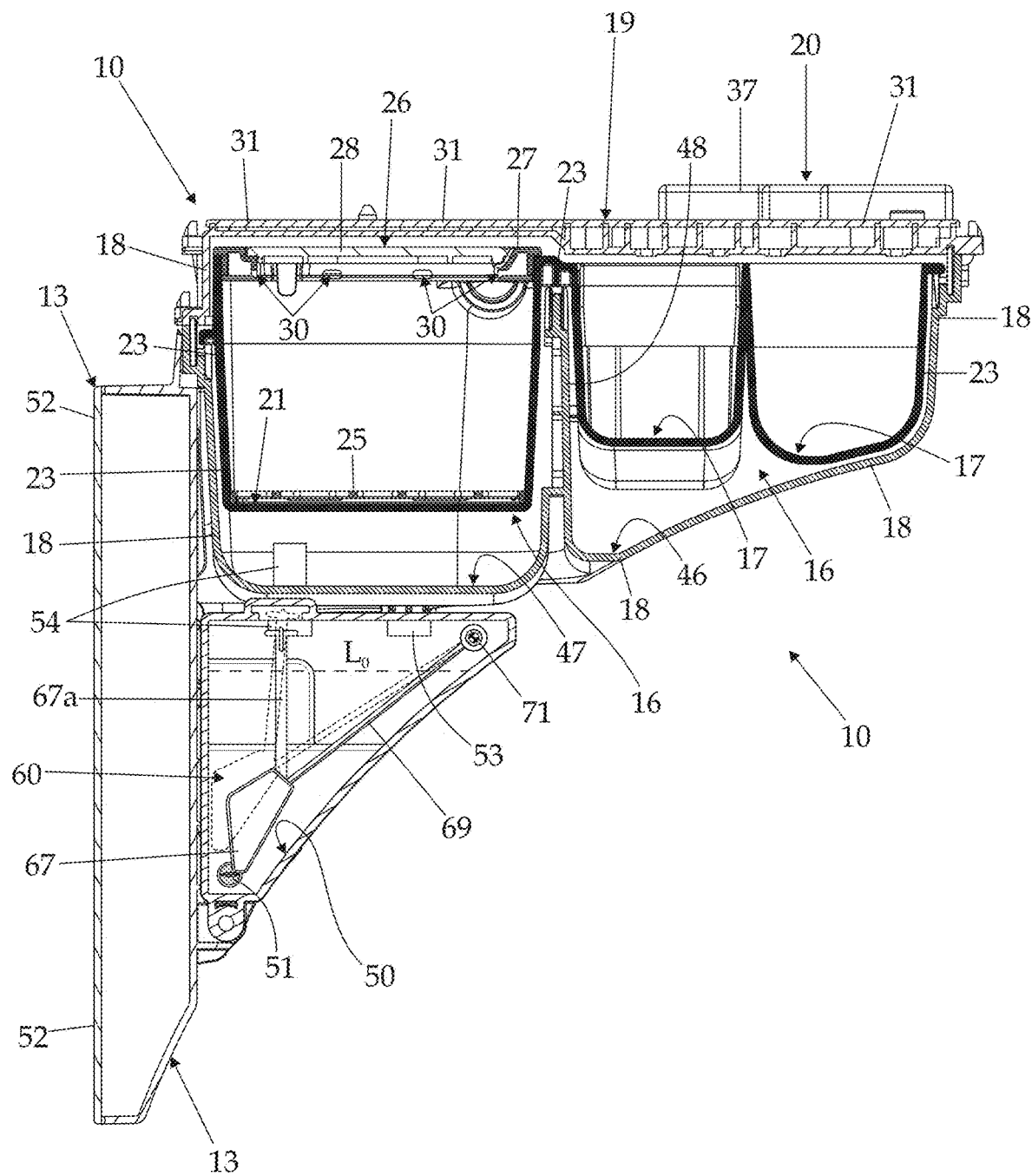
FIG. 7 is a sectioned front view of the detergent dispensing assembly shown in FIGS. 4 and 6, with parts removed for clarity.

With reference to FIGS. 7 and 8, the detergent drawer 16 is preferably additionally provided with a preferably manually-removable, water-permeable partitioning septum 25 which extends inside the regeneration-agent compartment 21 immediately above the bottom of regeneration-agent compartment 21 and its large pass-through opening 22, and has a water-permeable structure designed for preventing the grains of consumable salt to come out of the regeneration-agent compartment 21 via the draining opening 22 and, at same time, for allowing the brine to trickle onto the bottom of the regeneration-agent compartment 21 and then freely flow by gravity towards the draining opening 22.

Preferably the partitioning septum 25 furthermore has a water-permeable structure suitably designed to slow down the outflow of the brine from the regeneration-agent compartment 21 via draining opening 22 thus to cause a temporarily stagnation of the water poured into the regeneration-agent compartment 21, above the same partitioning septum 25

In other words, the water-permeable partitioning septum 25 is arranged above the draining opening 22 so as to completely cover the latter, and is preferably structured to allow the passage of the water/brine through the same partitioning septum 25 with a flowrate which is lower than that of the fresh water channelled/poured into the regeneration-agent compartment 21 by the drawer flush circuit 19, thus to cause the stagnation of the fresh water above the partitioning septum 25.

Preferably the water-permeable partitioning septum 25 furthermore extends inside regeneration-agent compartment 21, slightly spaced from, and preferably also locally substantially parallel to, the bottom of regeneration-agent compartment 21, so as to form a thin air gap immediately above the bottom of regeneration-agent compartment 21.

In the example shown, in particular, the water-permeable partitioning septum 25 preferably consists in a rigid plate-like element 25 preferably made of plastic material, which substantially copies the shape of the bottom of regeneration-agent compartment 21, and has a microperforated structure which is suitably dimensioned to cause a prolonged stagnation of the water poured into the regeneration-agent compartment 21 above the partitioning septum 25.

More in detail, the central portion of plate-like element 25 is preferably provided with a plenty of substantially evenly distributed, transversal pass-through microholes or micro-slots each preferably having a cross-sectional area lower that 3 mm² (square millimetres), so as to allow the flow/passage of the brine/water through the partitioning septum 25 with a flowrate preferably ranging between 0.4 and 1 litre/min (litre per minute). The flowrate of the fresh water poured into the regeneration-agent compartment 21 instead preferably ranges between 5 and 8 litre/min (litre per minute).

With reference to FIGS. 3, 4, 6, 7 to 8, the detergent drawer 16 preferably, though not necessarily, additionally comprises a manually openable, upper lid assembly 26 which is firmly fitted on the drawer main body 23, on top of the regeneration-agent compartment 21, and is structured to selectively close the upper mouth of regeneration-agent compartment 21, preferably so as to almost completely cover the upper mouth of regeneration-agent compartment 21. Furthermore, this upper lid assembly 26 is additionally structured so as to be able to receive, from the drawer flush circuit 19 and at least when detergent drawer 16 is placed in the retracted position, a flow of fresh water and to channel said water into the beneath-located regeneration-agent compartment 21, preferably while spreading out the same fresh water inside the regeneration-agent compartment 21.

In other words, the upper lid assembly 26 is preferably provided with a water inlet which is faced to the outside of regeneration-agent compartment 21 and is structured to allow the fresh water to enter into the same upper lid assembly 26, and with one or more water outlets which are faced to the inside of regeneration-agent compartment 21, fluidically communicate with said water inlet, and are finally suitably structured to allow the water entered into the upper lid assembly 26 through the water inlet to come out of the lid assembly 26 and fall into the regeneration-agent compartment 21.

The drawer flush circuit 19, in turn, is preferably structured to separately channel, when detergent drawer 16 is placed in the retracted position, a flow of fresh water towards the water inlet of the upper lid assembly 26.

In other words, drawer flush circuit 19 is preferably structured for channeling, when detergent drawer 16 is placed in the retracted position, the fresh water arriving from water distributor module 20 towards the water inlet of lid assembly 26 which, in turn, is structured to distribute the fresh water arriving from drawer flush circuit 19 into the regeneration-agent compartment 21, so as to dissolve some of the salt grains (NaCl) contained into the regeneration-agent compartment 21 and form the brine that falls on the bottom of drawer housing 18 via opening 22.

Drawer flush circuit 19 is therefore preferably suitably structured for separately channelling, when the detergent drawer 16 is completely fitted/inserted into drawer housing 18, the fresh water arriving from water distributor module 20 towards any one of the detergent compartments 17, and towards the water inlet of the upper lid assembly 26.

In addition to the above, in the example shown the water inlet of lid assembly 26 is preferably furthermore structured to hydraulically couple, when detergent drawer 16 is placed in the retracted position, in a stable, though easy detachable manner, with the drawer flush circuit 19 for receiving the fresh water of the water mains, and the upper lid assembly 26 is preferably structured to drip the fresh water into the regeneration-agent compartment 21.

With reference to FIGS. 4, 6, 7 and 8, in the example shown, in particular, the upper lid assembly 26 preferably comprises: a plate-like member 27 which is structured to rigidly fit into the upper rim of regeneration-agent compartment 21 to substantially completely cover/close the upper mouth of the regeneration-agent compartment 21; and a manually-movable trapdoor 28 which is arranged to close a preferably substantially rectangular-shaped, large pass-through opening which is preferably formed roughly at centre of plate-like member 27, and which is preferably suitably shaped/dimensioned to allow the user to easily manually pour the consumable salt (NaCl) or other regeneration agent into the regeneration-agent compartment 21.

The plate-like member 27 preferably has a hollow structure and is preferably provided with a water inlet 29 which is suitably structured to watertight couple, when detergent drawer 16 is placed in the retracted position, with the drawer flush circuit 19 thus to allow the fresh water to enter into the plate-like member 27; and with one or more water-outlets 30 which are arranged on the lower face of plate-like member 27, preferably all around the central pass-through opening closed by trapdoor 28. Each water-outlet 30 allows the fresh water entered into the plate-like member 27 to slowly come out of plate-like member 27 and freely fall into the regeneration-agent compartment 21.

Preferably the water-outlets 30 of plate-like member 27 are furthermore suitably shaped/structured to pour a shower of water droplets by gravity into the regeneration-agent compartment 21.

The manually-movable trapdoor 28, in turn, is preferably flag-hinged to plate-like member 27 at one of the two major sides of central pass-through opening, so as to be able to rotate about a rotation axis locally substantially coplanar to plate-like member 27.

Drawer flush circuit 19 is therefore preferably structured to selectively couple, when detergent drawer 16 is placed in the retracted position, with the water inlet 29 of plate-like member 27, so as to be able to channel the fresh water of the water mains into the plate-like member 27 of lid assembly 26 which, in turn, distributes said water into the regeneration-agent compartment 21.

With reference to FIGS. 4, 5, 6, 7 and 9, in particular the drawer flush circuit 19 of detergent dispenser 10 preferably comprises a plate-like water conveyor 31 which is suitably structured to form the upper lid of the substantially basin-shaped drawer housing 18, so as to be located immediately above the detergent drawer 16 when the latter is placed in the retracted position, i.e. when the latter is completely inserted/recessed into drawer housing 18, and is provided with a number of water-delivery portions each suitably structured to allow the outflow of water from plate-like water conveyor 31 towards the beneath-located detergent drawer 16.

The water distributor module 20, in turn, is preferably coupled/associated to the plate-like water conveyor 31, and is suitably structured to selectively channel the softened fresh water arriving from the water softening device 13 or the unsoftened fresh water arriving from fresh-water supply circuit 12, towards any one of the water-delivery portions of the plate-like water conveyor 31.

Figure 9:
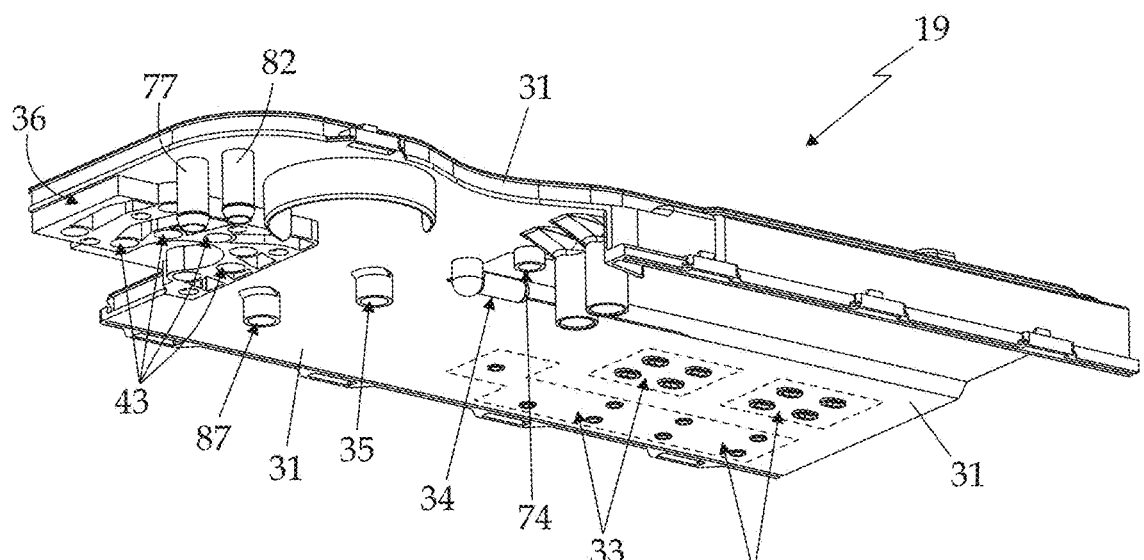
FIG. 9 is a perspective view of the upper lid of the drawer housing of the detergent dispensing assembly shown in FIGS. 6 and 7.
Figure 11:
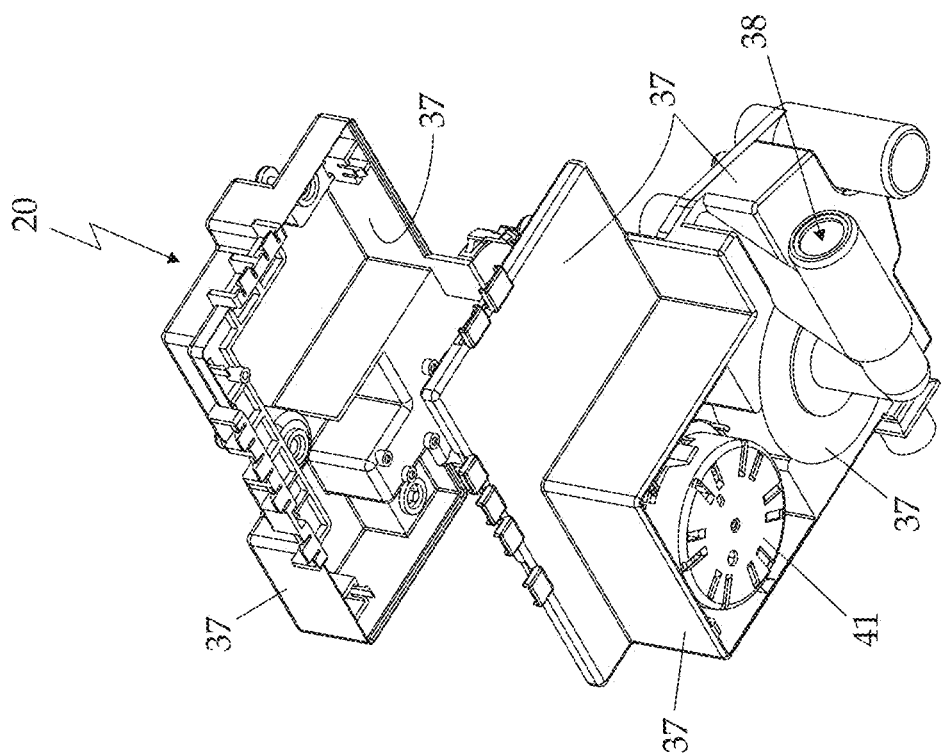
FIGS. 10 and 11 are enlarged and partially exploded perspective views of the water diverter of the detergent dispensing assembly shown in FIGS. 4, 6 and 7.

More in detail, with particular reference to FIG. 9, the plate-like water conveyor 31 is to provided, on the side directly faced to the inside of drawer housing 18, with a group of first water-delivery portions 33 which are locally substantially vertically aligned, when detergent drawer 16 is placed in the retracted position, each to a respective detergent compartment 17 of detergent drawer 16, and are each suitably structured to allow the slow outflow of the fresh water from the water conveyor 31 towards the beneath-located detergent compartment 17.

In the example shown, in particular, each water-delivery portion 33 of plate-like water conveyor 31 is preferably structured to pour by gravity a shower of water droplets directly into the beneath-located detergent compartment 17 of detergent drawer 16.

Preferably the plate-like water conveyor 31 is furthermore provided, on the side directly faced to the inside of drawer housing 18, with a second water-delivery portion 34 which is locally substantially vertically aligned, when detergent drawer 16 is placed in the retracted position, to the regeneration-agent compartment 21 of detergent drawer 16, and is suitably structured to allow the outflow of the fresh water from the plate-like water conveyor 31 towards the beneath-located regeneration-agent compartment 21.

More in detail, with reference to FIGS. 6 and 9, in the example shown the water-delivery portion 34 preferably comprises a male or female hydraulic connector which is suitably structured to couple, when detergent drawer 16 is placed in the retracted position, in detachable manner with a complementary second hydraulic connector which is incorporated into the water inlet 29 of the upper lid assembly 26, or better into the water inlet 29 of plate-like member 27, so as to put the upper lid assembly 26 in fluid communication with the plate-like water conveyor 31.

Preferably the plate-like water conveyor 31 is furthermore provided, on the side directly faced to the inside of drawer housing 18, with a third water-delivery portion 35 which is vertically misaligned to the detergent drawer 16 placed in retracted position, and is structured to allow the outflow of the water from the plate-like water conveyor 31 directly towards the bottom of drawer housing 18 and then towards the washing tub 3 without affecting the detergent compartment/s 17 of detergent drawer 16.

The electrically-operated, water distributor module 20, in turn, is preferably capable of selectively channeling the softened fresh water arriving from water softening device 13 or the unsoftened fresh water arriving from fresh-water supply circuit 12 towards any one of the water-delivery portions 33, 34 and 35.

More in detail, the electrically-operated, water distributor module 20 is preferably firmly attached to the outside of the plate-like water conveyor 31, at a coupling socket 36 preferably realized on one of the two major faces of the same plate-like water conveyor 31. The electrically-operated, water distributor module 20 is therefore discrete from plate-like water conveyor 31.

With reference to FIGS. 6, 10, 11 and 12, in particular, the electrically-operated, water distributor module 20 basically comprises:
- a manifold body 37 having a water inlet 38 and a number of water outlets 39;
- a flow diverter (not shown) which is fitted in axially rotatable manner inside the manifold body 37, and is capable of channeling, according to its angular position inside the manifold body 37, the water entering into the manifold body 37 via the water inlet 38 towards any one of the water outlets 39 of the same manifold body 37; and
- an electrically-powered motor assembly 41 which is at least partially recessed/accommodated inside the manifold body 37, and is mechanically connected to the rotatable flow diverter for controlling the angular position of the flow diverter inside the manifold body 37.

The water inlet 38 of water distributor module 20 communicates with the water softening device 13 for directly receiving a flow of softened fresh water, and preferably also with the fresh-water supply circuit 12 for also directly receiving a flow of unsoftened fresh water. The water outlets 39 of water distributor module 20, in turn, separately communicate with corresponding water-delivery portions 33, 34 and 35 of plate-like water conveyor 31, so that the water distributor module 20 is capable of selectively feeding, towards any one of the water-delivery portions 33, 34 and 35 of plate-like water conveyor 31, the softened or unsoftened fresh water entering into the water distributor module 20.

In addition to the above, the water distributor module 20 moreover comprises a local electronic control unit 42 which is discrete from the main electronic control unit 14, and is to accommodated into a corresponding seat formed on the manifold body 37, and is finally configured for directly powering and/or controlling the internal water channeling means of water distributor module 20, or better the electrically-powered motor assembly 41 of the rotatable flow diverter, according to the control signals arriving from the main electronic control unit 14.

In other words, the motor assembly 41 is directly powered and/or controlled by the electronic control unit 42 which, in turn, is discrete from the main electronic control unit 14, is preferably located/recessed inside the manifold body 37 of water distributor module 20, preferably beside the electrically-powered motor assembly 41, and finally electronically communicates with the main electronic control unit 14.

More in detail, in the example shown the manifold body 37 preferably has a first inner compartment or seat accommodating the rotatable flow diverter, a second compartment or seat accommodating the electrically-powered motor assembly 41, and finally a third inner compartment or seat accommodating the local electronic control unit 42. The water inlet 38 and the water outlets 39 of manifold body 37 are in direct communication exclusively with this first inner compartment or seat.

As an alternative, the electrically-operated, water distributor module 20 may have, in place of the rotatable flow diverter and of the corresponding electrically-powered motor assembly 41, an electrically-operated valve assembly comprising a number of electrically-operated on-off valves which are housed/accommodated inside the manifold body 37 and are capable to put the water inlet 38 in direct fluid communication selectively and alternatively with any one of the water outlets 39, thus to selectively channel the softened or unsoftened fresh water entering into the manifold body 37 via the water inlet 38 towards any one of the water outlets 39 of the manifold body 37.

Likewise the rotatable flow diverter and the corresponding electrically-powered motor assembly 41, the electrically-operated on-off valves are obviously directly controlled by the local electronic control unit 42 according to the control signals arriving from the main electronic control unit 14.

In the example shown, in particular, the manifold body 37 of water distributor module 20 is preferably structured to couple with the plate-like water conveyor 31 at coupling socket 36, whereas the water outlets 39 of manifold body 37 are located, preferably one side by side the other, at the interface portion of manifold body 37 suited to couple with the coupling socket 36 of plate-like water conveyor 31.

Figure 10:
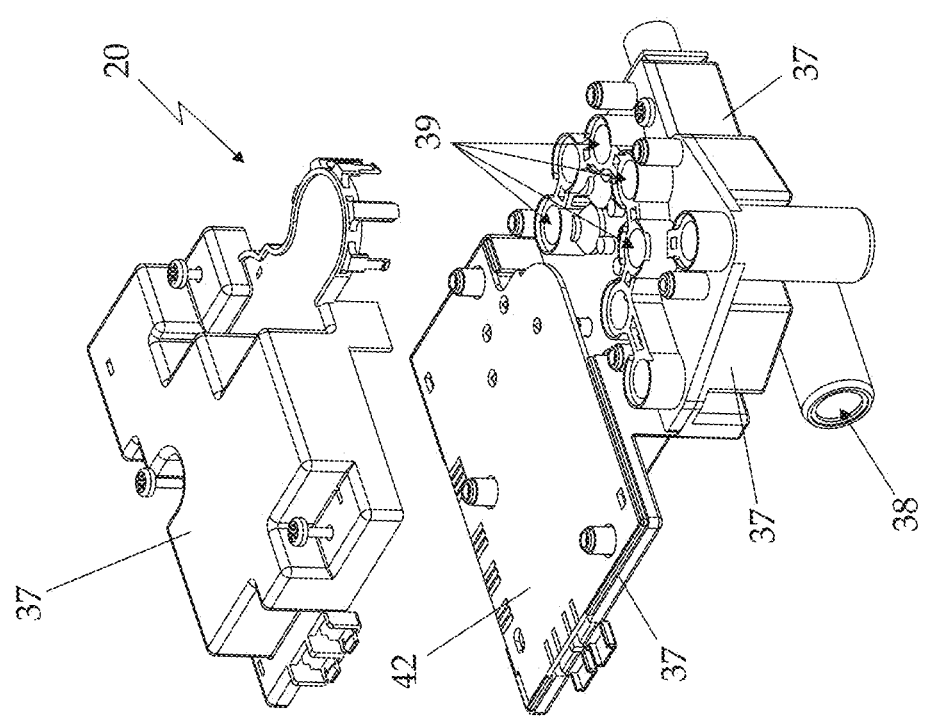

With reference to FIGS. 6, 9 and 10, the plate-like water conveyor 31, on the other hand, is provided with a number of water inlets 43 which are located at coupling socket 36 and separately fluidically communicate each with a respective water-delivery portion 33, 34, 35 of the water conveyor 31 via a corresponding internal water channel extending inside the body of the same water conveyor 31. Preferably each water outlet 39 of the water distributor module 20 is structured to watertight couple/connect, at coupling socket 36, with a corresponding water inlet 43 of plate-like water conveyor 31, preferably with the interposition of a corresponding annular sealing gasket.

The electrically-operated, water distributor module 20 is therefore structured to selectively and alternatively channel, on command, the water entering into the same water distributor module 20 via the water inlet 38 towards any one of the water inlets 43 of the plate-like water conveyor 31.

In addition to the above, in the example shown the plate-like water conveyor 31 of drawer flush circuit 19 is preferably furthermore structured to directly receive the unsoftened fresh water from the fresh-water supply circuit 12, to channel said unsoftened fresh water towards the water inlet of water softening, device 13, and to channel the softened fresh water coming out from the water outlet of water softening device 13 towards the water inlet 38 of water distributor module 20.

With reference to FIGS. 3, 6 and 7, the bottom of drawer housing 18 in turn is preferably divided into two separated and substantially basin-shaped, bottom portions 46 and 47 which are located, when detergent drawer 16 is placed in retracted position, respectively underneath all detergent compartments 17 of detergent drawer 16 and underneath the regeneration-agent compartment 21 of detergent drawer 16.

More in detail, in the example shown the bottom of drawer housing 18 is preferably divided into two separated and substantially basin-shaped bottom portions 46 and 47, which are arranged side by side to one another transversally to the displacement direction d of detergent drawer 16 inside drawer housing 18, i.e. transversally to the longitudinal axis L of drawer housing 18. The basin-shaped bottom portion 46 is vertically aligned, when detergent drawer 16 is placed in the retracted position, to the one or more detergent compartments 17 of detergent drawer 16, and preferably also to the water-delivery portion 35 of plate-like water conveyor 31. The basin-shaped bottom portion 47, in turn, is vertically aligned, when detergent drawer 16 is placed in the retracted position, to the regeneration-agent compartment 21 of detergent drawer 16.

With particular reference to FIGS. 6 and 7, drawer housing 18 preferably furthermore comprises a substantially vertical, partitioning wall 48 that protrudes upwards from the bottom of drawer housing 18 while remaining locally substantially parallel to the displacement direction d of detergent drawer 16, i.e. parallel to the longitudinal axis L of drawer housing 18, and the basin-shaped bottom portions 46 and 47 of drawer housing 18 are arranged on opposite sides of partitioning wall 48.

In other words the vertical partitioning wall 48 is arranged between the two basin-shaped bottom portions 46 and 47 of drawer housing 18.

Detergent drawer 16, in turn, is preferably arranged astride the partitioning wall 48 and the drawer main body 23 is designed so that the one or more detergent compartments 17 and the regeneration-agent compartment 21 are located on opposite sides of partitioning wall 48. Preferably detergent drawer 16 is furthermore structured to additionally abut in sliding manner on the straight upper crest line of partitioning wall 48.

With reference to FIGS. 2 and 6, the basin-shaped bottom portion 46 is structured for receiving the mixture of fresh water and detergent, softener or other washing agent falling down from any one of the detergent compartments 17 of detergent drawer 16 via the corresponding siphon assembly, and optionally the water falling down from the water-delivery portion 35 of plate-like water conveyor 31, and communicates with the inside of washing tub 3 preferably via a connecting duct 49 that branches off from the basin-shaped bottom portion 46 of drawer housing 18 and ends directly into the beneath-located washing tub 3, so as to allow the mixture of water and detergent, softener or other washing agent to quickly flow by gravity directly into the washing tub 3.

With reference to FIGS. 4, 5, 6 and 7, the basin-shaped bottom portion 47, in turn, is structured for receiving the brine (i.e. the salt water) trickling/falling down from the regeneration-agent compartment 21 via opening 22, and directly communicates with the inside of a discrete, small brine tank 50 which is dimensioned to catch and contain a given amount of brine preferably greater than 100 ml (millilitres), and is arranged underneath the same basin-shaped bottom portion 47 so as to allow the brine to quickly fall/flow by gravity directly into the brine tank 50 and to accumulate therein.

Preferably said brine tank 50 furthermore fluidically communicates with the inside of the water softening device 13 via a small, electrically-powered pump assembly 51 which is directly powered and/or controlled by the local electronic control unit 42, and is capable of selectively pumping the brine (i.e. the salt water) accumulated into brine tank 50, from brine tank 50 to water softening device 13, and preferably also to watertight isolate brine tank 50 from water softening device 13 when deactivated.

In the example shown, in particular, brine tank 50 is preferably dimensioned to contain a maximum amount of brine preferably overapproximating, i.e. slightly greater than, the whole amount of brine to be pumped into the internal water softening device 13 for performing the regeneration process of the ion-exchange resins located inside the same water softening device 13.

More in detail, assuming for example that the overall amount of brine to be pumped into the water softening device 13 for performing the whole regeneration process of the ion-exchange resins is preferably equal to 250 $cm^3$ (cubic centimeters), brine tank 50 is preferably dimensioned to contain a maximum amount of brine preferably equal to 270 $cm^3$ (cubic centimeters).

With reference to FIGS. 4, 6, 7 and 13, in the example shown, in particular, the water softening device 13 preferably comprises a substantially plate-like, discrete modular cartridge 52 which is provided with a water inlet and a water outlet, and is filled with a given amount of ion-exchange resins capable of retaining the calcium and magnesium ions (Ca++ and Mg++) dissolved in the water flowing through the same modular cartridge 52.

This modular cartridge 52 is preferably furthermore rigidly attached to a sidewall of drawer housing 18 preferably by means of one or more anchoring screws and/or one or more releasable mechanical couplings, so as to cantilevered extend downwards beyond the bottom of drawer housing 18 and next to brine tank 50, preferably while remaining locally substantially parallel and tangent to a vertical sidewall of the outer casing 2.

Preferably the water inlet and a water outlet of modular cartridge 52 are additionally fluidically connected to the plate-like water conveyor 31 preferably via appropriate hydraulic connectors, so that the modular cartridge 52 is crossable by the unsoftened fresh water arriving from freshwater supply circuit 12 and flowing inside the plate-like water conveyor 31 directed towards the water inlet 38 of water distributor module 20.

Brine tank 50, in turn, is preferably firmly attached directly to the bottom of drawer housing 18, preferably locally substantially vertically aligned to the basin-shaped bottom portion 47 of drawer housing 18 and preferably by means of one or more anchoring screws and/or one or more releasable mechanical couplings.

Preferably brine tank 50 is moreover adjacent to modular cartridge 52 and is preferably rigidly attached also to the same modular cartridge 52, preferably by means of one or more anchoring screws and/or one or more releasable mechanical couplings.

With reference to FIGS. 4, 6, 7, 13 and 14, in the example shown, in particular, brine tank 50 preferably directly communicates with the basin-shaped bottom portion 47 of drawer housing 18 via a first vertical pipe-extension 53 that protrudes downwards from the bottom of drawer housing 18 and directly fits, preferably in a substantially airtight and/or watertight manner, into a complementary brine inlet opening 53a formed on top wall of the same brine tank 50 preferably with the interposition of a corresponding annular sealing gasket.

In addition to the above, brine tank 50 preferably directly communicates with the basin-shaped bottom portion 47 of drawer housing 18 also via a second vertical pipe-extension 54 that protrudes downwards from the bottom of drawer housing 18 and directly fits, preferably in a substantially airtight and/or watertight manner, into a complementary air vent opening 54a formed on top wall of brine tank 50, beside the brine inlet opening 53a, preferably with the interposition of a corresponding annular sealing gasket, Furthermore, with reference to FIG. 7, in the example shown vertical pipe-extension 54 preferably additionally protrudes upwards into drawer housing 18 within the perimeter of the basin-shaped bottom portion 47, so as to arrange its upper mouth at a given high from the basin-shaped bottom portion 47 and thus prevent the brine from normally freely falling into brine tank 50 via the same vertical pipe-extension 54.

As a result, the brine preferably falls into brine tank 50 solely via the vertical pipe-extension 53, and the vertical pipe-extension 54 allows free ventilation of brine tank 50 and moreover the selective overflow into brine tank 50 of the exceeding brine that may accidentally stagnate on the basin-shaped bottom portion 47 of drawer housing 18.

With reference to FIGS. 4, 7 and 13, pump assembly 51, in turn, is preferably interposed between brine tank 50 and modular cartridge 52 of water softening device 13 so as to remain unmovably trapped between brine tank 50 and modular cartridge 52 when they are rigidly attached to one another.

Moreover pump assembly 51 preferably basically comprises an electrically-powered membrane pump 55 or other electrically-powered volumetric pump, which has the suction of the pump connected to brine tank 50 preferably via a first duckbill valve 56, so as to be able to suck the brine from the inside of brine tank 50, and the delivery of the pump connected to the modular cartridge 52 of water softening device 13 preferably via a second duckbill valve 57, so as to be able to feed the brine into the water softening device 13. The electrically-powered membrane pump 55 is directly powered and/or controlled by the local electronic control unit 42.

Moreover, detergent dispenser 10, brine tank 50, water softening device 13, pump assembly 51, and local electronic control unit 42 preferably altogether form a preassembled intermediate modular assembly structured to be easily fitted into the box-like casing 2 of the laundry washing machine 1.

Figure 12:
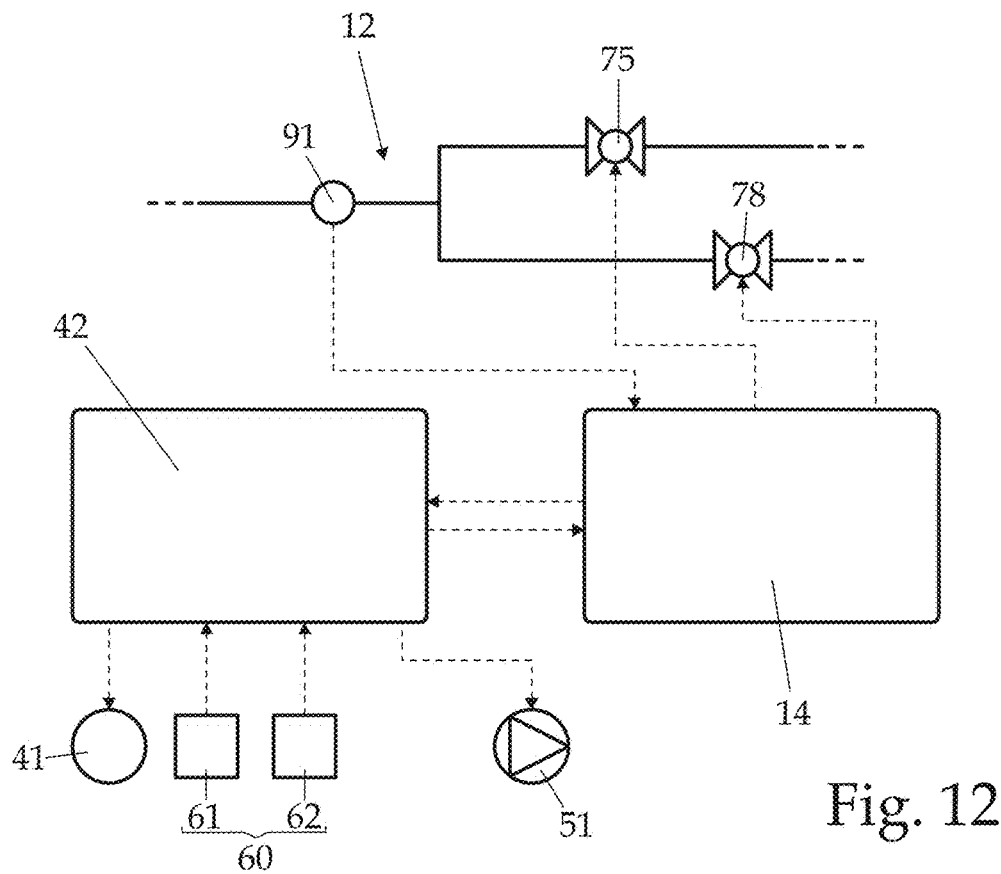
FIG. 12 is a schematic view of the electronic control system of the FIG. 1 laundry washing machine.

With reference to FIGS. 7, 12 and 14, in addition to the above the laundry washing machine 1 furthermore comprises a detector assembly 60 which is associated to brine tank 50, is capable of monitoring the salinity degree of the brine (i.e. salt water) stored into brine tank 50 and/or of detecting the level of the fresh water or brine (i.e. salt water) stored inside brine tank 50, and directly electronically communicates with the local electronic control unit 42.

More in detail, the local electronic control unit 42 preferably directly powers and/or controls the detector assembly 60; whereas the detector assembly 60 is preferably capable of detecting when the salinity degree of the brine (i.e. salt water) stored into brine tank 50 exceeds a predetermined minimum salinity value, and/or of detecting when the level of the fresh water or brine (i.e. salt water) stored inside brine tank 50 is equal to or higher than a predetermined threshold value $L_0$.

Preferably said predetermined minimum salinity value is furthermore equal to or higher than the minimum salinity value required to successfully perform the regeneration process of the ion-exchange resins contained into the water softening device 13. Detector assembly 60 therefore is preferably structured for detecting whether the salinity degree of the brine (i.e. salt water) currently stored into brine tank 50 is equal to or exceeds a predetermined minimum salinity value sufficient to successfully perform the regeneration process of the ion-exchange resins contained into the water softening device 13.

The threshold value $L_0$, in turn, preferably corresponds to a brine tank 50 completely filled up with fresh water or brine (i.e. salt water), i.e. filled up with an amount of brine sufficient to successfully perform the regeneration process of the ion-exchange resins contained into the water softening device 13. Detector assembly 60 therefore is preferably structured for detecting whether the current level of brine inside brine tank 50 is sufficient to successfully perform the regeneration process of the ion-exchange resins contained into the water softening device 13

More in detail, assuming that brine tank 50 is preferably dimensioned to contain a maximum amount of brine preferably equal to 270 $cm^3$ (cubic centimeters), the threshold value $L_0$ preferably corresponds to 270 $cm^3$ (cubic centimeters) of fresh water or brine into brine tank 50.

As an alternative, the threshold value $L_0$ could correspond to a brine tank 50 filled up with an amount of fresh water or brine (i.e. salt water) significantly lower than the maximum capacity of brine tank 50, and preferably solely sufficient to avoid cavitation or other malfunctioning of pump assembly 51.

More in detail, assuming that brine tank 50 is preferably dimensioned to contain a maximum amount of brine preferably equal to 270 cm$^3$ (cubic centimeters), the threshold value $L_0$ could correspond to only 20 cm$^3$ (cubic centimeters) of fresh water or brine into brine tank 50.

In the example shown, in particular, detector assembly 60 is preferably at least partially accommodated inside brine tank 50, and is preferably structured for detecting, at same time, whether the salinity degree of the brine (i.e. salt water) stored into brine tank 50 exceeds said minimum salinity value, and whether the level of the fresh water or brine (i.e. salt water) stored inside brine tank 50 is equal to or higher than said predetermined threshold value $L_0$.

Preferably detector assembly 60 is therefore incorporated in the preassembled intermediate modular assembly together with detergent dispenser 10, brine tank 50, water softening device 13, pump assembly 51, and electronic control unit 42.

With reference to FIGS. 12 and 14, in the example shown, in particular, detector assembly 60 preferably comprises: a salinity detector device 61 which is capable of detecting when the salinity degree of the brine inside brine tank 50 is equal to or exceeds said minimum salinity value; and a water-level detector device 62 which is capable of detecting when the level of the water or brine inside brine tank 50 is equal to or exceeds the threshold value $L_0$. Both salinity detector device 61 and water-level detector device 62 electronically communicate with the local electronic control unit 42.

With reference to FIGS. 7 and 14, in the example shown, in particular, the water-level detector device 62 preferably comprises: a first floating body 63 which has a nominal density lower than that of the fresh water (i.e. lower than roughly 1000 kg/m$^3$), so as to float in presence of any kind of water (i.e. both fresh water and brine), and is housed inside brine tank 50 with the capability to freely move upwards and downwards according to the current level of fresh water or brine inside brine tank 50; and a corresponding electronic sensing unit 64 which is capable of monitoring the position of floating body 63 inside brine tank 50.

Preferably the floating body 63 is moreover housed inside brine tank 50 with the capability to freely move upwards and downwards between a lowered position and a raised position according to the current level of fresh water or brine inside brine tank 50, and electronic sensing unit 64 is preferably capable of detecting when floating body 63 reaches said specific raised position inside the brine reservoir 50.

The raised position of floating body 63 corresponds to a level of fresh water or brine salt water) inside brine tank 50 equal to or exceeding said threshold value $L_0$. The lowered position of floating body 63, in turn, preferably corresponds to roughly no fresh water or brine (i.e. salt water) inside brine tank 50.

The electronic sensing unit 64 obviously electronically communicates with the local electronic control unit 42 so as to timely signal to the same local electronic control unit 42 when the floating body 63 reaches said specific raised position.

More in detail, in the example shown the floating body 63 is preferably rigidly attach to the distal end of a guide arm 65 which is pivotally jointed to a sidewall of brine tank 50 so as to be able to freely swing up and down inside brine tank 50 while remaining on a vertical reference plane.

The electronic sensing unit 64, in turn, preferably comprises a presence sensor 66 which is capable of detecting when the floating body 63 is in said specific raised position corresponding to an actual level of the fresh water or brine inside brine tank 50 equal to or exceeding the threshold value More in detail, the electronic sensing unit 64 is preferably located on top of brine tank 50, vertically aligned to the floating body 63, and preferably comprises a presence sensor 66 which is capable of detecting when the floating body 63 substantially abuts against the top wall of brine tank 50.

In the example shown, in particular, the electronic sensing unit 64 is preferably accommodated on a hollow seat formed on top wall of brine tank 50, preferably vertically aligned to floating body 63, and the presence sensor 66 preferably comprises a mechanical transducer, namely a microswitch, capable of signalling when floating body 63 abuts against the same mechanical transducer 66.

Still with reference to FIGS. 7 and 14, the salinity detector device 61, in turn, preferably comprises: a second floating body 67 which has a nominal density higher than that of the fresh water, and is housed inside brine tank 50 with the capability to move upwards and downwards; and a corresponding electronic sensing unit 68 capable of monitoring the position of floating body 67.

More in detail, the floating body 67 preferably has a nominal density higher than that of the fresh water and underapproximating, i.e. slightly lower than, the density of the brine having a salinity degree equal to said minimum salinity value (i.e. a brine capable of successfully performing the regeneration process of the ion-exchange resins of the water softening device 13), so as to float only in presence of selected brines having a salinity degree equal or higher that said minimum salinity value.

Preferably the floating body 67 is moreover housed inside brine tank 50 with the capability to freely move upwards and downwards between a lowered position and a raised position according to the current level of said selected brines inside brine tank 50, and the electronic sensing unit 68 is preferably capable of detecting when floating body 67 reaches said specific raised position inside brine tank 50.

The raised position of floating body 67 corresponds to a level of a selected brine (i.e. a brine having a salinity degree equal to or exceeding said minimum salinity value) inside brine tank 50 equal to or exceeding a predetermined second threshold value preferably lower than the threshold value $L_0$. The lowered position of floating body 67, in turn, preferably corresponds to roughly no selected brine (i.e. a brine having a salinity degree equal to or exceeding said minimum salinity value) inside brine tank 50.

More in detail, in the example shown floating body 67 has a nominal density preferably ranging between 1100 kg/m$^3$ and 1140 kg/m$^3$, so as to float only in presence of selected brines having a salinity degree preferably higher than 10% (i.e. preferably having more that 10 grams of dissolved salts per litre of water).

The second threshold value, in turn, corresponds for example to 70 cm$^3$ (cubic centimeters) of brine into brine tank 50.

Likewise electronic sensing unit 64, also electronic sensing unit 68 electronically communicates with the local electronic control unit 42 so as to timely signal to the same local electronic control unit 42 when the floating body 67 reaches said specific raised position.

With reference to FIGS. 7 and 14, similarly to floating body 63, in the example shown also floating body 67 is preferably rigidly attach to the distal end of a guide arm 69 which is pivotally jointed to brine tank 50 so as to be able to freely swing up and down inside brine tank 50 while remaining on a vertical reference plane.

The electronic sensing unit 68, in turn, preferably comprises a presence sensor 70 which is capable of detecting when the floating body 67 is arranged in said specific raised position corresponding to an actual level of the selected brine (i.e. a brine with a salinity degree equal to or exceeding said minimum salinity value) equal to or exceeding said second threshold value $L_0$.

More in detail, the electronic sensing unit 68 is preferably located on top of brine tank 50, vertically aligned to the floating body 67, and preferably comprises a presence sensor 70 which is capable of detecting when the floating body 67 substantially abuts against the top wall of brine tank 50.

In the example shown, in particular, the electronic sensing unit 68 is preferably accommodated on a hollow seat formed on top wall of brine tank 50, preferably vertically aligned to floating body 67, and the presence sensor preferably comprises a mechanical transducer 70, namely a microswitch, capable of signalling when floating body 67 abuts against the same mechanical transducer 70.

With reference to FIGS. 7 and 14, in particular, the floating bodies 63 and 67 are preferably pivotally jointed to brine tank 50 so as to be able to freely independently swing inside brine tank 50 one side by side the other.

More in detail, both guide arms 65 and 69 are fitted in axially rotatable manner on a common supporting pin or shaft 71 extending inside brine tank 50 substantially horizontally and very close and parallel to the sidewall of brine tank 50.

The electronic sensing units 64 and 68, in turn, are preferably incorporated on a single control board 72 which is electronically connected to the local electronic control unit 42, and is preferably accommodated on a corresponding hollow seat formed on top wall of brine tank 50, preferably vertically aligned to floating bodies 63 and 67.

Furthermore, each floating body 63, 67 is preferably provided with an upwards-protruding appendage 63*a*, 67*a* that cantilevered extends substantially vertically towards the top wall of brine tank 50, and is dimensioned to abut on the control board 71, against the corresponding mechanical transducer 66, 70, when the floating body 63, 67 reaches the corresponding raised position.

Figure 5:
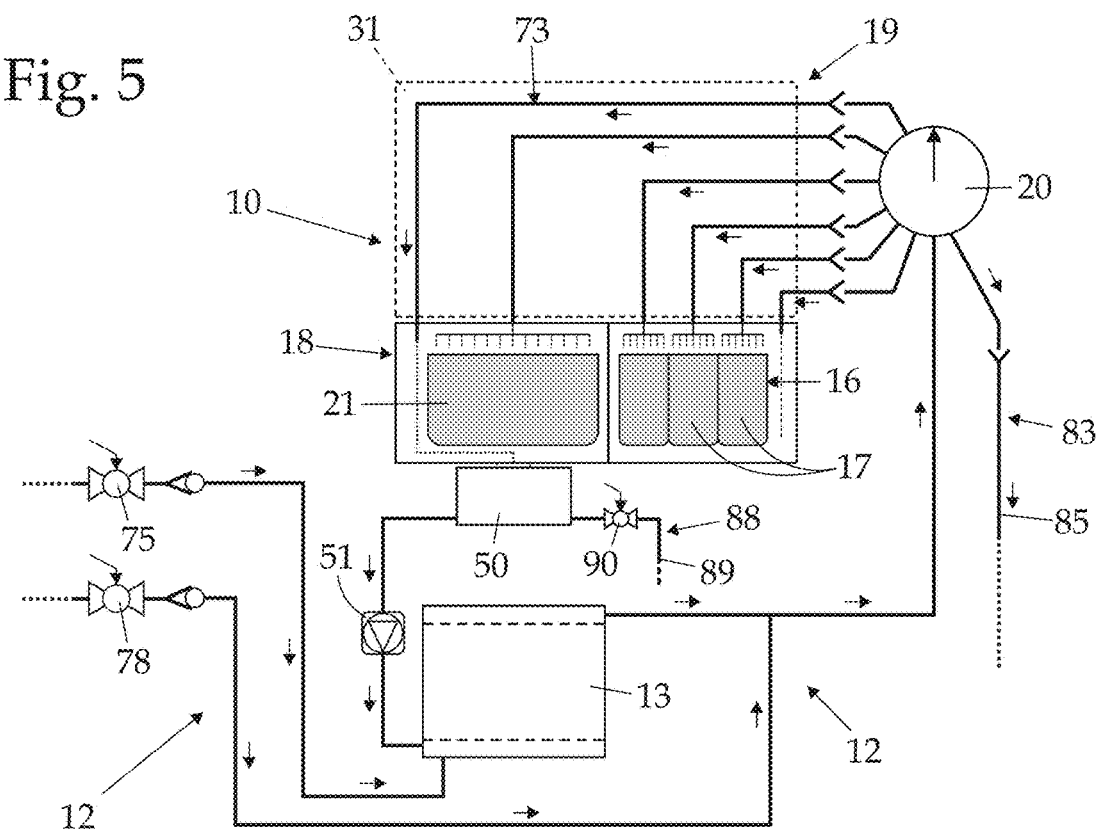
FIG. 5 is a schematic view of part of the hydraulic circuit of the FIG. 1 laundry washing machine.

With reference to FIG. 5, the laundry washing machine 1 is preferably furthermore provided with an auxiliary fresh-water supply line 73 which is capable of selectively channelling the fresh water of the water mains directly into the brine tank 50 while bypassing the regeneration-agent compartment 21 of detergent drawer 16, so that the non-salted fresh water can rinse the inside of brine tank 50.

Preferably the auxiliary fresh-water supply line 73 is furthermore directly controlled by the local electronic control unit 42

In the example shown, in particular, the auxiliary fresh-water supply line 73 is preferably incorporated into the drawer flush circuit 19 of detergent dispenser 10.

The drawer flush circuit 19 is therefore preferably structured to separately channel the fresh water arriving from the water distributor module 20 into anyone of the detergent compartments 17, into the regeneration-agent compartment 21, and additionally also into the basin-shaped bottom portion 47 of drawer housing 18 while bypassing the regeneration-agent compartment 21, or directly into brine tank 50

More in detail, with reference to FIG. 9, the plate-like water conveyor 31 is preferably provided, on the side directly faced to the inside of drawer housing 18, with a fourth water-delivery portion 74 which is vertically aligned to the bottom portion 47 of drawer housing 18 and vertically misaligned to the detergent drawer 16 arranged in retracted position, and is structured to allow the outflow of the fresh water from the plate-like water conveyor 31 towards the basin-shaped bottom portion 47 without affecting the regeneration-agent compartment 21.

In the example shown, in particular, the vertical pipe-extension 53 preferably branches off from the basin-shaped bottom portion 47 of drawer housing 18 at region of the basin-shaped bottom portion 32 vertically misaligned, when detergent drawer 16 is placed in the retracted position, to the drawer main body 23 of detergent drawer 16. The water-delivery portion 74 of plate-like water conveyor 31, in turn, is preferably arranged beside the water-delivery portions 33, 34 and 35, locally substantially vertically aligned to the vertical pipe-extension 53 protruding downwards from the bottom of drawer housing 18, and is preferably structured to project a jet of water into the upper mouth of the vertical pipe-extension 53 directly communicating with the inside of brine tank 50, thus to form an air-break.

In other words, in the example shown the drawer flush circuit 19 of detergent dispenser 10 is preferably structured to direct a jet of fresh water of the water mains directly into the upper mouth of the vertical pipe-extension 53, thus to pour the fresh water directly into brine tank 50. The electrically-operated, water distributor module 20, in turn, is preferably structured to selectively channel the water arriving to its water inlet 38 also towards the water-delivery portion 74 via a further internal water channel extending inside the body of plate-like water conveyor 31, from coupling socket 36 to water-delivery portion 74.

With particular reference to FIGS. 4, 5 and 6, the fresh-water supply circuit 12 of laundry washing machine 1, in turn, preferably comprises: a first water delivery line which is structured to channel the unsoftened fresh water of the water mains towards the water inlet of water softening device 13 preferably via the plate-like water conveyor 31 which, in turn, preferably furthermore channels the softened fresh water coming out from the water softening device 13 directly to the water inlet 38 of water distributor module 20; and optionally also a second water delivery line which is structured to channel the unsoftened fresh water of the water mains directly to the water inlet 38 of water distributor module 20 bypassing water softening device 13.

Both first and second water delivery lines are preferably directly controlled by main electronic control unit 14.

More in detail, the first water delivery line of fresh-water supply circuit 12 preferably basically comprises a first electrically-operated on-off valve 75 which is connectable to the water mains and is preferably directly controlled by the main electronic control unit 14, and a first connecting tube 76 or other piping which fluidically connects the on-off valve 75 to a corresponding auxiliary pipe-fitting 77 of plate-like water conveyor 31.

The auxiliary pipe-fitting 77 of plate-like water conveyor 31, in turn, fluidically communicates with the water inlet of the water softening device 13, or better with the water inlet of modular cartridge 52, whereas the water outlet of water softening device 13, or better the water outlet of modular cartridge 52, fluidically communicates with the water inlet 38 of water distributor module 20 via a further internal water channel extending inside the body of plate-like water conveyor 31 up to coupling socket 36.

The second water delivery line of fresh-water supply circuit 12, in turn, preferably basically comprises a second electrically-operated on-off valve 78 which is connectable to the water mains and is preferably directly controlled by the main electronic control unit 14, and a second connecting tube 79 or other piping which fluidically connects the on-off valve 78 directly to the water inlet 38 of water distributor module 20.

In addition to the above, with reference to FIGS. 4, 6 and 9, in the example shown the fresh-water supply circuit 12 preferably additionally comprises a third water delivery line which is structured to channel the hot unsoftened fresh water towards the water distributor module 20 or directly towards the washing tub 3.

Alike first and second water delivery lines, third water delivery line is preferably directly controlled by main electronic control unit 14.

More in detail, the third water delivery line of fresh-water supply circuit 12 preferably basically comprises: a further independent electrically-operated, on-off valve 80 which is separately connectable to a source of hot water (namely the hot branch of the piping, fittings, and fixtures involved in the distribution and use of hot water in the domestic building), and is preferably directly controlled by the main electronic control unit 14; and a further connecting tube 81 or other piping which fluidically connects the on-off valve 80 to a second pipe-fitting 82 that preferably protrudes from plate-like water conveyor 31 preferably next to pipe-fitting 77.

This second pipe-fitting 82 directly communicates, via a further internal water channel extending inside plate-like water conveyor 31 up to coupling socket 36, with the water inlet 38 of water distributor module 20, thus to channel a flow of hot, unsoftened fresh water towards the water inlet 38 of water distributor module 20.

As an alternative, pipe-fitting 82 of plate-like water conveyor 31 may directly communicate with the water inlet of the water softening device 13, or better with the water inlet of modular cartridge 52, thus to channel a flow of hot, unsoftened fresh water towards the water inlet of the water softening device 13.

With reference to FIGS. 2, 5 and 9, the water distributor module 20 is preferably finally structured to selectively channel any kind of water that enters into the same water distributor module 20, to a water drain line 83 that preferably branches off from the drawer flush circuit 19 and ends into the drain sump 84 of washing tub 3, or even directly into the suction of the electric pump that drains the waste water or washing liquor outside the laundry washing machine 1.

In the example shown, in particular, the water drain line 83 preferably comprises a tube 85 or other piping, that branches off from a funnel-shaped portion 86 of drawer casing 18 and fits directly into the drain sump 84 of washing tub 3.

With reference to FIG. 9, the plate-like water conveyor 31, in turn, is preferably provided, on the side directly faced to the inside of drawer housing 18, with a further water-delivery portion 87 which is substantially vertically aligned to the funnel-shaped portion 86 of drawer casing 18, and is structured to allow the outflow of any kind of water from the plate-like water conveyor 31 towards said funnel-shaped portion of drawer casing 18.

Alike the other water-delivery portions 33, 34, 35, 74 of plate-like water conveyor 31, the water-delivery portion 87 selectively receives, from the electrically-operated, water distributor module 20, any kind of water entering into the same water distributor module 20.

With reference to FIG. 5, the laundry washing machine 1 is preferably finally provided with a second water drain line 88 that beaches off from brine tank 50 and ends into the drain sump 84 of washing tub 3, or even directly into the suction of the electric pump that drains the waste water or washing liquor outside the laundry washing machine 1. Preferably second water drain line 88 is moreover directly controlled by the local electronic control unit 42.

In the example shown, in particular, the second water drain line 88 preferably comprises: a tube 89 or other piping, that branches off from the bottom of brine tank 50 and fits directly into the drain sump 84 of washing tub 3; and an electrically-operated, on-off valve 90 which is arranged along tube 89 for controlling the outflow of the water or brine from brine tank 50 towards drain sump 84, and is preferably directly controlled by the local electronic control unit 42.

General operation of the laundry washing machine 1 is similar to that of the front loading washing machine disclosed in European patent No. 2657387, the main exception being that the brine (i.e. salt water) accumulates into brine tank 50 before being supplied to the internal water softening device 13, i.e. to modular cartridge 52, for performing the regeneration process of the ion-exchange resins.

The partitioning septum 25 with micro-perforated structure, moreover, causes an extremely slow outflow of the brine (i.e. salt water) from the regeneration-agent compartment 21 which increases the salinity degree of the brine arriving into brine tank 50. The auxiliary fresh-water supply line 73, in turn, allows to selectively rinse/wash up the brine tank 50 preferably at the end of the regeneration process of the ion-exchange resins contained into the water softening device 13.

As regards interaction between main electronic control unit 14 and local electronic control unit 42, during the washing cycles the main electronic control unit 14 controls the motor assembly 6, the fresh-water supply circuit 12, and indirectly the water distributor module 20, so as to perform the washing cycle selected by the user. The local electronic control unit 42, in turn, passively controls the internal water channeling means of the water distributor module 20, or better the motor assembly 41 of the rotatable flow diverter, according to the control signals arriving from the main electronic control unit 14.

In addition to the above, with reference to FIG. 12, the electronic control unit 14 continuously controls, preferably via a traditional electronic water-meter 91 located along fresh-water supply circuit 12, the water consumption of the laundry washing machine 1 as from the last regeneration process of the ion-exchange resins of water softening device 13, i.e. the number of liters of fresh water entering into the laundry washing machine 1 as from the last regeneration process of the ion-exchange resins of water softening device 13, so as to determine when regeneration process of the ion-exchange resins of water softening device 13 is to be performed again.

When regeneration of the ion-exchange resins is to be performed, the main electronic control unit 14 electronically communicates to the local electronic control unit 42 that a regeneration process of the ion-exchange resins is to be performed, and temporarily leaves control of the laundry washing machine 1 to the local electronic control unit 42 so that the latter carries out the regeneration process of the ion-exchange resins.

More in detail, after taking control of the laundry washing machine 1, the local electronic control unit 42 operates the internal water channeling means of water distributor module 20, or better the motor assembly 41 of water distributor module 20, so as to channel, towards the regeneration-agent compartment 21, the softened or unsoftened fresh water entering into the water distributor module 20, and then requests the main electronic control unit 14 to open for a short time either the on-off valve 75 or the on-off valve 78 of the fresh-water supply circuit 12, so as to pour a given amount of fresh water, for example 100 cm$^3$ (cubic centimeters) of fresh water, into the regeneration-agent compartment 21.

Due to the presence of water-permeable partitioning septum 25, the softened or unsoftened fresh water poured into the regeneration-agent compartment 21 temporarily accumulates above the partitioning septum 25 wherein can dissolve a great amount of salt grains and form the brine.

The brine formed into the regeneration-agent compartment 21, above the partitioning septum 25, slowly passed across the partitioning septum 25 and then trickles into the basin-shaped bottom portion 47 of drawer housing 18. From the basin-shaped bottom portion 47, the 100 cm$^3$ (cubic centimeters) of brine then quickly falls into brine tank 50 wherein accumulates.

Then, if detector assembly 60 detects that in brine tank 50 there is room for other brine, the local electronic control unit 42 requests the main electronic control unit 14 to open again for a short time either the on-off valve 75 or the on-off valve 78 of the fresh-water supply circuit 12, so as to pour some more fresh water, for example another 100 cm$^3$ (cubic centimeters) of fresh water, into the regeneration-agent compartment 21, so as to form further 100 cm$^3$ of brine that, again, slowly moves into brine tank 50.

Sequential quantum supplying of fresh water into the regeneration-agent compartment 21 continues until brine tank 50 is completely filled with brine, i.e. the level of the brine into brine tank 60 is equal to or exceeds the threshold value $L_0$.

In other words, the local electronic control unit 42 continues feeding fresh water into the regeneration-agent compartment 21 until brine tank 50 contains an amount of brine sufficient for performing the whole regeneration process of the ion-exchange resins contained into water softening device 13.

When detector assembly 60 detects that level of the brine into brine tank 50 is equal to or exceeds the threshold value $L_0$ and that the salinity value of the brine inside brine tank 50 is equal to or higher than said predetermined minimum salinity value, the local electronic control unit 42 activates pump assembly 51 to move at a time the whole brine from brine tank 50 to water softening device 13, so as to till up the water softening device 13 with brine.

In other words, when brine tank 50 is completely filled with brine, the local electronic control unit 42 activates pump assembly 51 so as to substantially empty the brine tank 50 into the water softening device 13.

Preferably, immediately before activating pump assembly 51, the local electronic control unit 42 moreover operates the internal water channeling means of water distributor module 20, i.e. the motor assembly 41, so as put the water inlet 38 of water distributor module 20 in direct communication with either the water-delivery portion 35 of plate-like water conveyor 31 or the water-delivery portion 86 of plate-like water conveyor 31, so as to channel any kind of water entering into the water distributor module 20 directly towards washing tub 3 or water drain line 83.

In other words, the local electronic control unit 42 preferably operates the internal water channeling means of water distributor module 20 so as to directly channel the water coming out from water softening device 13 either to washing tub 3 or to water drain line 83.

The regeneration process of the ion-exchange resins begins when the brine contained into brine tank 50 moves into the water softening device 13.

During the regeneration process of the ion-exchange resins, i.e. during the stay of the brine inside the water softening device 13, the local electronic control unit 42 preferably leaves control again to the main electronic control unit 14 so as to continue the washing cycle.

More in detail, when pump assembly 51 finishes pumping the brine from brine tank 50 to water softening device 13, the local electronic control unit 42 preferably electronically communicates to the main electronic control unit 14 that the regeneration process of the ion-exchange resins is in progress, and awaits any request of the main electronic control unit 14 for repositioning the water channeling means of water distributor module 20 and continue the washing cycle.

As an alternative, during the regeneration process of the ion-exchange resins, the local electronic control unit 42 operates the internal water channeling means of water distributor module 20, or better the motor assembly 41, so as to channel the fresh water entering into the water distributor module 20 directly towards the water-delivery portion 74 of plate-like water conveyor 31, i.e. directly towards brine tank 50 while bypassing the regeneration-agent compartment 21, and then requests the main electronic control unit 14 to open again the on-off valve 78 of fresh-water supply circuit 12 thus to feed fresh water directly into brine tank 50.

The fresh water channelled into the brine tank 50 serves for rinsing/washing up the inside of brine tank 50.

In the example shown, in particular, the local electronic control unit 42 keeps the on-off valve 78 open until brine tank 50 is completely filled with fresh water.

After having filled up brine tank 50 with fresh water, the local electronic control unit 42 operates the internal water channeling means of water distributor module 20, or better the motor assembly 41 of water distributor module 20, so as to put the water inlet 38 of water distributor module 20 in direct communication with either the water-delivery portion 35 of plate-like water conveyor 31 or the water-delivery portion 86 of plate-like water conveyor 31, so as to channel any kind of water entering into the water distributor module 20 directly towards washing tub 3 or water drain line 83, and the awaits the end of the regeneration process of the ion-exchange resins.

After a given time preferably, though not necessarily, ranging between 10 and 20 minutes, the local electronic control unit 42 assumes that the regeneration process of the ion-exchange resins is completed and activates again the electric-pump assembly 51 to move at a time the whole rinse water from brine tank 50 to water softening device 13, so as to substantially empty the brine tank 50 and at same time push the brine out of water softening device 13.

As an alternative, rather than activating again pump assembly 51, the local electronic control unit 42 may request the main electronic control unit 14 to open again the on-off valve 75 of fresh-water supply circuit 12 thus to feed fresh water directly into water softening device 13.

In both cases, the brine coming out from the water outlet of water softening device 13 preferably enters into the water distributor module 20 and is immediately channeled to the washing tub 3 or to the drain line 83 thus to leave as soon as possible the laundry washing machine 1.

Preferably, furthermore, the local electronic control unit 42 may fill up brine tank 50 with fresh water and subsequently move said fresh water into the water softening device 13 several times, thus to repeatedly wash up/rinse both the brine tank 50 and the water softening device 13 to clean and remove any salt deposit inside both components.

As an alternative, rather than activating again pump assembly 51, the local electronic control unit 42 may open for a short time the electrically-operated, on-off valve 90 of drain line 88, thus to empty the brine tank 50 directly into the drain sump 84 without affecting the water softening device 13.

When washing up/rinsing of brine tank 50 and/or of water softening device 13 is completed, the local electronic control unit 42 returns control to the main electronic control unit 14, and awaits any request of the main electronic control unit 14 for repositioning the internal water channeling means of water distributor module 20 and continue the washing cycle.

According to an alternative mode of operating, regeneration process of the ion-exchange resins is directly controlled by the main electronic control unit 14 and local electronic control unit 42 passively drives the internal water channeling means of water distributor module 20, i.e. the motor assembly 41, and pump assembly 51 according to electronic signals arriving from electronic control unit 14. In other words the main electronic control unit 14 never leaves control to local electronic control unit 42 for performing the regeneration process of the ion-exchange resins of water softening device 13.

The advantages resulting from allowing the local electronic control unit 42 to directly power and/or control the internal water channeling means of water distributor module 20, the pump assembly 51 and finally the detector assembly 60 are large in number.

First of all, wiring of the household appliance is greatly simplified because the laundry washing machine 1 requests a sole electronic connection between the main electronic control unit 14 and the local electronic control unit 42.

Furthermore the water distributor module 20 forms, together with the detergent dispenser 10, the brine tank 50, the water softening device 13 and the pump assembly 51, an intermediate modular assembly which can be easily preassembled apart from the laundry washing machine 1 and subsequently supplied to the production line of the laundry washing machine 1, thus significantly reducing overall production costs.

Clearly, changes may be made to the laundry washing machine 1 without, however, departing from the scope of the present invention.

For example, according to a non-shown alternative embodiment, the local electronic control unit 42 is accommodated on a corresponding socket or seat formed on the outer surface of manifold body 37.

Moreover, with reference to FIG. 15, according to a further alternative embodiment, the electronic sensing units 64 and 68 are arranged outside brine tank 50, preferably in abutment on top wall of the same brine tank 50 and preferably vertically aligned to floating bodies 63 and 67.

Preferably the presence sensor 66, 70 of each electronic sensing unit 64, 68 moreover comprises optical- or magnetic-type transducer/s which are capable of detecting when the corresponding floating body 63, 67, or better the distal ends of the upwards-protruding appendage 63a, 67a of the corresponding floating body, abuts against, or is very close to the top wall of brine tank 50.

More in detail, in the example shown the electronic sensing units 64 and 68 are preferably incorporated on a single preferably substantially U-shaped, control board 100 which is preferably fork fitted onto an upwards-extending protrusion 101 formed on top wall of brine tank 50, and which electronically communicates with the local electronic control unit 42.

The distal ends of the upwards-protruding appendages 63a and 67a of floating bodies 63 and 67, in turn, are preferably allowed to directly abut against the top wall of brine tank 50, inside the upwards-extending protrusion 101 on top wall of the same brine tank 50.

In the example shown, in particular, the presence sensor 66 of electronic sensing unit 64 preferably comprises a photo-emitter 102 and a photo-receiver 103 which are located on control board 100, aligned to one another on opposite sides of protrusion 101. The photo-emitter 102 generates a light beam that travels across protrusion 101 before reaching the photo-receiver 103, whereas the distal end of the upwards-protruding appendage 63a of floating body 63 is structured to interrupt the light beam directed to photo-receiver 103 preferably when abuts against the top wall of brine tank 50, inside the upwards-extending protrusion 101.

Similarly the presence sensor 70 of electronic sensing unit 68 preferably comprises a photo-emitter 104 and a photo-receiver 105 which are located on control board 100, aligned to one another on opposite sides of protrusion 101. The photo-emitter 104 generates a light beam that travels across protrusion 101 before reaching the photo-receiver 105, whereas the distal end of the upwards-protruding appendage 67a of floating body 67 is structured to interrupt the light beam directed to photo-receiver 104 preferably when abuts against the top wall of brine tank 50, inside the upwards-extending protrusion 101.

As an alternative, each floating body 63, 67 may have, incorporated on the distal end of the corresponding appendage 63a, 67a, an insert made of ferromagnetic material or permanent-magnetic material.

The presence sensor 66, 70 of the corresponding electronic sensing unit 64, 68, in turn, may comprise an magnetic transducer which is located on control board 100, close to protrusion 101, and is capable of switching according to the strength of the magnetic field in the proximity of the transducer. Magnetic field that significantly increases when the distal end of the appendage 63a, 67a abuts against or is very close to the top wall of brine tank 50, inside the upwards-extending protrusion 101.

Furthermore, according to a further non-shown alternative embodiment the brine tank 50 may be incorporated into the drawer housing 18.

In other words, the bottom portion 47 of drawer housing 18 may integrally have a big catchment sump wherein the brine accumulates, and pump assembly 51 sucks the brine from the bottom of said catchment sump.

Preferably this catchment sump furthermore may be dimensioned to contain a given amount of brine which is preferably greater than 100 ml (millilitres), and which preferably also overapproximates the whole amount of brine to be pumped into the internal water softening device 13 for performing the regeneration process of the ion-exchange resins located inside the same water softening device 13.

Obviously detector assembly 60 is preferably at least partly accommodated inside the catchment sump formed on the bottom portion 47 of drawer housing 18 for detecting whether the salinity degree of the brine (i.e. salt water) stored into catchment sump exceeds said predetermined minimum salinity value, and optionally also for detecting whether the level of the fresh water or brine (i.e. salt water) accumulated into the same catchment sump is equal to or higher than said threshold value $L_0$.

In addition to the above, according to a further non-shown and less-sophisticated embodiment, the detergent drawer 16 lacks the manually openable, upper lid assembly 26, and the water-delivery portion 34 is arranged on the plate-like water conveyor 31 so as to be locally substantially vertically aligned, when detergent drawer 16 is placed in the retracted position, to the regeneration-agent compartment 21 of detergent drawer 16 and is structured to pour the fresh water directly into the beneath-located regeneration-agent compartment 21.

Preferably the water-delivery portion 34 of the plate-like water conveyor 31 is furthermore structured to pour by gravity a shower of water droplets directly into the beneath-located regeneration-agent compartment 21 of detergent drawer 16.

In other words, the drawer flush circuit 19 of detergent dispenser 10 is preferably capable of pouring by gravity a shower of water droplets selectively and alternatively into any one of the detergent compartments 17 and into the regeneration-agent compartment 21, and for additionally channelling the fresh water of the water mains directly to the brine tank 50 bypassing the regeneration-agent compartment 21 of detergent drawer 16.

With reference to FIG. 16, in a further alternative embodiment, the regeneration-agent compartment 21 is located/incorporated into a corresponding manually extractable, regeneration-agent drawer 200 which is discrete from detergent drawer 16, and is fitted/inserted in manually extractable manner into a corresponding substantially basin-shaped, drawer housing 201 which is preferably located/recessed inside casing 2 horizontally beside the detergent dispenser 10.

Drawer housing 201, in turn, has its own basin-shaped bottom portion which is structured for receiving the brine trickling/falling down from the regeneration-agent compartment 21 through the corresponding draining opening 22, and directly communicates with the inside of a beneath-located brine tank 50 so as to allow the brine to quickly fall/flow by gravity directly into the brine tank 50 and to accumulate therein.

Brine tank 50, therefore, is located underneath the drawer housing 201 and is fluidically connected to said drawer housing 201 for catching and accumulating the brine trickling/falling down from the regeneration-agent compartment 21 through the corresponding draining opening 22.

Likewise the previous embodiments, brine tank 50 communicates with the inside of the water softening device 13 via the electrically-powered pump assembly 51 which is capable of selectively pumping the fresh water or brine (i.e. salt water) accumulated into brine tank 50, from brine tank 50 to water softening device 13, and preferably also to watertight isolate the brine tank 50 from the water softening device 13 when deactivated.

Similarly to the main embodiment, the drawer housing 201 preferably directly communicates with brine tank 50 via at least one, and preferably two vertical pipe-extensions (not shown) that protrudes downwards from the bottom of drawer housing 201 and directly fits, preferably in a substantially airtight and/or watertight manner, into corresponding openings formed on top wall of the brine tank 50 preferably with the interposition of corresponding annular sealing gaskets.

Again the detector assembly 60 is preferably at least partly accommodated inside the brine tank 50 for detecting whether the salinity degree of the brine (i.e. salt water) stored into brine tank 50 exceeds a predetermined minimum salinity value, and/or for detecting whether the level of the fresh water or brine (i.e. salt water) accumulated into the same brine tank 50 is equal to or higher than the predetermined threshold value $L_0$.

Preferably detergent drawer 16 and regeneration-agent drawer 200 are furthermore independently movable inside the respective drawer housings 18 and 201 parallel to and side by side to one another.

More in detail, alike detergent drawer 16, the regeneration-agent drawer 200 is movable in a substantially horizontally-oriented, displacement direction between:
- a retracted position in which regeneration-agent drawer 200 is almost completely recessed into the front wall 4 of casing 2 and the regeneration-agent compartment 21, or better the upper lid assembly 26, is inaccessible to the user; and
- a completely extracted position in which regeneration-agent drawer 200 partly juts out from the front wall 4 of casing 2, so that the regeneration-agent compartment 21 is exposed and fully accessible to the user prior opening of the upper lid assembly 26.

With reference to FIG. 15, in the example shown, in particular, drawer housing 201 is preferably realized in one piece with drawer housing 18, and the plate-like water conveyor 31 of drawer flush circuit 19 is preferably structured to form the upper lid of both drawer housings 18 and 201.

Furthermore, even if regeneration-agent compartment 21 is no more formed/incorporated to into the drawer main body 23 of detergent drawer 16, the manually-sizable front panel 24 of detergent drawer 16 is preferably still dimensioned to close, when detergent drawer 16 is placed in the retracted position, both the entrance of drawer housing 18 and the adjacent entrance of drawer housing 201. Thus the axial displacement of regeneration-agent drawer 200 towards the completely extracted position is exclusively allowable when also the detergent drawer 16 is placed in the extracted position.

In a further non-shown alternative embodiment, the drawer flush circuit 19 of detergent dispenser 10 is structured to solely channel the fresh water of the water mains into any one of the detergent compartments 17 of detergent drawer 16 and into the regeneration-agent compartment 21; and the laundry washing machine 1 furthermore comprises an auxiliary fresh-water supply line which is directly connectable to the water mains and/or is incorporated into the fresh-water supply circuit 12, and is structured for selectively channelling a flow of fresh water from the water mains directly into the brine tank 50 while bypassing the regeneration-agent compartment 21 of detergent drawer 16.

In this embodiment, therefore, the auxiliary fresh-water supply line is discrete from drawer flush circuit 19, and brine tank 50 receives the fresh water directly from the water mains, bypassing the water distributor module 20 and the drawer flush circuit 19. The local electronic control unit 42 preferably, though not necessarily, controls also this auxiliary fresh-water supply line.

More in detail, the auxiliary fresh-watersupply line may comprise: a further independent electrically-operated, on-off valve which is separately connectable to the water mains, and is preferably directly controlled by the local electronic control unit 42; and a connecting tube or other piping which directly connects said electrically-operated, on-off valve directly to brine tank 50 thus to channel the fresh water of the water mains directly into brine tank 50.

In a further non-shown and less-sophisticated embodiment, furthermore the drawer flush circuit 19 of detergent dispenser 10 may be structured to solely pour the fresh water of the water mains selectively and alternatively into any one of the detergent compartments 17 of detergent drawer 16.

In this less-sophisticated embodiment, furthermore, the laundry washing machine 1 may additionally comprise a second auxiliary fresh-water supply line which is directly connectable to the water mains and/or is incorporated into the fresh-water supply circuit 12, and is structured for selectively channelling a flow of fresh water from the water mains directly into the regeneration-agent compartment 21, or better into the upper lid assembly 26 located on top of regeneration-agent compartment 21. This second auxiliary fresh-water supply line is therefore discrete from drawer flush circuit 19.

The local electronic control unit 42 preferably, though not necessarily, controls also this second auxiliary fresh-water supply line.

More in detail, this second auxiliary fresh-water supply line may comprise a further independent electrically-operated, on-off valve which is separately connectable to the water mains, and is preferably directly controlled by the local electronic control unit 42; and a connecting tube or other piping which directly connects said further electrically-operated, on-off valve to an hydraulic connector which is stationary inside the drawer housing 18 and is structured to couple, when detergent drawer 16 or regeneration-agent drawer 200 is placed in the retracted position, in detachable manner with the water inlet 29 of the upper lid assembly 26, so as to put the upper lid assembly 26 in fluid communication with said tube.

In this less-sophisticated variation, therefore, the regeneration-agent compartment 21 of detergent drawer 16, or the upper lid assembly 26 if present, receives the fresh water directly from the water mains bypassing the drawer flush circuit 19 and the water distributor module 20.

According to a still further not-shown alternative embodiment, the detergent drawer 16 of detergent dispenser 10 may have, in place of the draining opening 22, a siphon assembly which is located inside the regeneration-agent compartment 21 and is suitably structured/dimensioned to selectively channel the brine formed inside the regeneration-agent compartment 21 onto the bottom of drawer housing 18.

According to a still further not-shown alternative embodiment, the one or more detergent compartments 17 of detergent drawer 16 may be dimensioned to contain a given amount of detergent, softener or other washing agent sufficient for performing a number of washing cycles. Furthermore, the detergent drawer 16 may optionally comprise, for each detergent compartment 17, a respective electrically-powered detergent feeding pump which is structured to selectively suck the dose of detergent, softener or other washing agent necessary to perform a washing cycle from the detergent compartment 17 and pump said dose of detergent, softener or other washing agent on the basin-shaped bottom portion 46 of drawer housing 18.

According to a still further not-shown and less-sophisticated alternative embodiment, the water distributor module 20 may be incorporated into the plate-like water conveyor 41 of drawer flush circuit 19 as disclosed in EP2562303, and the local electronic control unit 42 is located/accommodated into a corresponding seat formed into the resulting outer casing.

Lastly, in a non-shown alternative embodiment of laundry washing machine 1, the laundry loading/unloading opening may be located on the upper worktop or top wall 11 of boxlike casing 2, and the washing tub 3 may be arranged inside casing 2 with the mouth directly facing the upper worktop or top wall 11. The rotatable drum, in turn, may be fitted vertically into washing tub 3 with the concavity facing the upper mouth of washing tub 3, so as to be able to rotate about a substantially vertically-oriented, longitudinal axis.

The invention claimed is:

1. A laundry washing machine having an outer casing and comprising, inside said outer casing:
   a washing tub;
   a rotatable drum which is housed in axially rotatable manner inside the washing tub and is structured for housing the laundry to be washed;
   a detergent dispenser which is structured for supplying detergent into the washing tub;
   a fresh-water supply circuit which is structured for selectively channelling a flow of fresh water from the water mains towards the detergent dispenser and/or the washing tub;
   an internal water softening device which is connected to the detergent dispenser and/or the fresh-water supply circuit for being crossed by the fresh water directed towards the detergent dispenser and/or the washing tub, and is filled with a water softening agent capable of reducing the hardness degree of the fresh water;
   a brine reservoir for receiving and accumulating a given amount of brine;
   a pump assembly capable of selectively moving the brine from the brine reservoir to the water softening device for regenerating the water softening properties of the water softening agent;
   a water distributor module for supplying water to the detergent dispenser;
   a water conveyor provided with a number of water-delivery portions located at a coupling socket; and
   a main electronic control unit controlling operation of the laundry washing machine,
   said water distributor module comprising:
      a manifold body having a water inlet and a number of water outlets;
      electrically-operated, internal water channelling means which are at least partially located inside the manifold body, and are structured to selectively put the water inlet of the manifold body in fluid communication with any one of the water outlets of the same manifold body;
   wherein:
      the water distributor module is coupled to the water conveyor via the coupling socket, and
      the water inlet water outlets are aligned with the water-delivery portions of the water conveyor, such that when coupled together, a number of the water outlets of the water distributor module fluidically communicate with corresponding first water-delivery portions of the water conveyor; and
      a local electronic control unit separate from the main electronic control unit, the local electronic control unit is accommodated in a corresponding seat formed on the manifold body and is configured to:
         receive control signals from the main electronic control unit, and
         in response to receiving the control signals, directly power and/or control, both the pump assembly and the electrically-operated, internal water channelling means.

2. The laundry washing machine according to claim 1, wherein the water inlet of the water distributor module fluidically communicates with the fresh-water supply circuit and/or the water softening device for receiving unsoftened and/or softened fresh water.

3. The laundry washing machine according to claim 1, wherein one or more of the water outlets of the water distributor module fluidically communicate with the detergent dispenser.

4. The laundry washing machine according to claim 3, further comprising an auxiliary water-supply line which is structured for selectively channelling a flow of fresh water into the brine reservoir bypassing the regeneration-agent reservoir; the local electronic control unit directly controlling also the auxiliary water-supply line.

5. The laundry washing machine according to claim 4, wherein the water conveyor of the drawer flush circuit is additionally provided with a third water-delivery portion which is structured to allow the outflow of the water from the water conveyor towards the brine reservoir bypassing the regeneration-agent compartment; and in that a water outlet of the water distributor module fluidically communicates with the water-delivery portion.

6. The laundry washing machine according to claim 1, further comprising a regeneration-agent reservoir structured for being manually fillable with a given amount of consumable salt or other regeneration agent, and a first water-supply line which is structured for selectively channelling a flow of water into the regeneration-agent reservoir so as to form brine; the brine reservoir being fluidically connected to the regeneration-agent reservoir for receiving and accumulating the brine arriving from the regeneration-agent reservoir.

7. The laundry washing machine according to claim 6, wherein a water outlet of the water distributor module fluidically communicates with the first water-supply line.

8. The laundry washing machine according to claim 1, wherein a water outlet of the water distributor module fluidically communicates with the brine reservoir.

9. The laundry washing machine according to claim 1, further comprising a detector assembly which is associated to the brine reservoir, and is capable of monitoring the salinity degree of the brine stored into the brine reservoir and/or the level of the water or brine stored inside brine reservoir; the local electronic control unit electronically communicating with the detector assembly.

10. The laundry washing machine according to claim 9, wherein the detector assembly is capable of detecting whether the salinity degree of the brine stored into the brine reservoir exceeds a predetermined minimum salinity value sufficient to successfully perform the regeneration process of the water softening agent contained into the water softening device.

11. The laundry washing machine according to claim 9, wherein the detector assembly is capable of detecting whether the amount of brine contained into the brine reservoir is sufficient to successfully perform the regeneration process of the water softening agent contained into the water softening device.

12. The laundry washing machine according to claim 1, wherein the electrically-operated, internal water channelling means comprise: a flow diverter which is fitted movable manner inside the manifold body of the water distributor module, and is capable of channeling, according to its position inside the manifold body, the water entering into the manifold body via the water inlet towards any one of the water outlets of the same manifold body; and an electrically-powered motor assembly which is fixed to the manifold body of the water distributor module, and is mechanically connected to the flow diverter for controlling the position of the flow diverter inside the manifold body.

13. The laundry washing machine according to claim 12, wherein the flow diverter is fitted in rotatable manner inside the manifold body of the water distributor module, and is capable of channeling, according to its angular position inside the manifold body, the water entering into the manifold body via the water inlet towards any one of the water outlets of the same manifold body; the electrically-powered motor assembly being able to control the angular position of the flow diverter inside the manifold body.

14. The laundry washing machine according to claim 12, wherein the manifold body of the water distributor module comprises a first inner compartment or seat accommodating the flow diverter, a second compartment or seat accommodating the electrically-powered motor assembly, and a third inner compartment or seat accommodating the local electronic control unit.

15. The laundry washing machine according to claim 1, wherein the detergent dispenser comprises: a first drawer which is provided with one or more substantially basin-shaped, detergent compartments structured for being manually fillable with a given amount of detergent, softener or other washing agent, and which is fitted/inserted in extractable manner into a corresponding drawer housing recessed into the outer casing; and a drawer flush circuit which is fluidically connected to the fresh-water supply circuit and/or the water softening device via the water distributor module, and is structured for pouring the water arriving from the fresh-water supply circuit or the water softening device into any one of the detergent compartments.

16. The laundry washing machine according to claim 15, wherein the drawer flush circuit comprises the water conveyor which forms the upper lid of the drawer housing of the first drawer, so as to be located above the first drawer when the first drawer is inserted/recessed into the drawer housing, and the first water-delivery portions each of which is vertically aligned to a respective detergent compartment and is structured to allow the outflow of the water from the water conveyor towards the beneath-located detergent compartment.

17. The laundry washing machine according to claim 15, wherein the regeneration-agent reservoir is a substantially basin-shaped, regeneration-agent compartment which is located on the first drawer beside the one or more detergent compartments.

18. The laundry washing machine according to claim 17, wherein the water conveyor is additionally provided with a second water-delivery portion which is locally aligned to the regeneration-agent compartment of the first or second drawer; and in that a water outlet of the water distributor module fluidically communicates with the second water-delivery portion.

19. The laundry washing machine according to claim 15, further comprising a second drawer which is fitted/inserted in extractable manner into a corresponding drawer housing recessed into the outer casing, beside the first drawer, and which is provided with a substantially basin-shaped, regeneration-agent compartment forming the regeneration-agent reservoir.

20. The laundry washing machine according to claim 15, wherein the brine reservoir is a discrete brine tank which is located underneath the drawer housing of the first or of the second drawer and which fluidically communicates with the drawer housing for receiving the brine coming out from the regeneration-agent compartment of the first or the second drawer.

21. The laundry washing machine according to claim 1, wherein the detergent dispenser, the water softening device, the regeneration-agent reservoir, the brine reservoir, the pump assembly and the local electronic control unit altogether form an intermediate modular assembly structured to be fitted into the outer casing.

22. The laundry washing machine according to claim 1, further comprising a main electronic control unit which is adapted to implement a washing cycle selected by the user and which electronically communicates with the local electronic control unit so that the pump assembly and the internal water channeling means are driven according to the signals arriving from the main electronic control unit; the main electronic control unit being located on a supporting structure which is different and discrete from the manifold body of the water distributor module.

23. The laundry washing machine according to claim 1, wherein the water softening device contains a given amount of ion-exchange resins capable of retaining the calcium and magnesium ions dissolved in the water that flows through the same water softening device.

24. The laundry washing machine according to claim 1, wherein the regeneration-agent reservoir is dimensioned to accommodate an amount of consumable salt or other regeneration agent sufficient for performing one or more regeneration processes of water softening capabilities of the water softening agent contained into the water softening device.

25. The laundry washing machine according to claim 1, wherein the local electronic control unit is further configured to:
- take over control of the laundry washing machine in response to a first command received from the main electronic control unit; and
- relinquish control of the laundry washing machine to the main electronic control unit in response to a second command received from the main electronic control unit.

* * * * *